United States Patent
Kelly

(10) Patent No.: US 11,620,775 B2
(45) Date of Patent: Apr. 4, 2023

(54) METHOD OF DISPLAYING A COMPOSITE IMAGE ON AN IMAGE DISPLAY

(71) Applicant: PANAMORPH, INC., Colorado Springs, CO (US)

(72) Inventor: Shawn L. Kelly, Colorado Springs, CO (US)

(73) Assignee: PANAMORPH, INC., Colorado Springs, CO (US)

( * ) Notice: Subject to any disclaimer, the term of this patent is extended or adjusted under 35 U.S.C. 154(b) by 148 days.

(21) Appl. No.: 17/216,557

(22) Filed: Mar. 29, 2021

(65) Prior Publication Data

US 2021/0304473 A1 Sep. 30, 2021

Related U.S. Application Data

(60) Provisional application No. 63/029,388, filed on May 22, 2020, provisional application No. 63/002,341, filed on Mar. 30, 2020.

(51) Int. Cl.
G06T 11/60 (2006.01)
G06T 3/40 (2006.01)

(52) U.S. Cl.
CPC ............... *G06T 11/60* (2013.01); *G06T 3/40* (2013.01)

(58) Field of Classification Search
CPC .................................. G06T 3/40; G06T 11/60
See application file for complete search history.

(56) References Cited

U.S. PATENT DOCUMENTS

| 5,121,448 A | 6/1992 | Katayama et al. |
| 5,881,176 A | 3/1999 | Keith et al. |
| 7,366,319 B2 | 4/2008 | Andrew et al. |

(Continued)

FOREIGN PATENT DOCUMENTS

| WO | 2009052772 A2 | 7/2008 |
| WO | 2013036972 A1 | 3/2013 |

(Continued)

OTHER PUBLICATIONS

Taubman et al. "JPEG2000: Standard for interactive imaging." In: Proceedings of the IEEE 90.8. Aug. 2002 (Aug. 2002).

(Continued)

*Primary Examiner* — Michelle L Sams
(74) *Attorney, Agent, or Firm* — Kurt L. VanVoorhies

(57) ABSTRACT

A composite image displayed on an image display incorporates a first portion of image content, and incorporates one or more second portions of image content within corresponding one or more picture regions of the composite image. One or more images properties selected from a resolution, a level of magnification, a measure of pan, a size, and a scale of each of the first and second image portions can be modified, and the modification of an image property of the one or more second portions of image content entails receiving either supplemental or replacement image data that provides for displaying a corresponding modified version of the corresponding one or more second portions of image content, the modification of which can be independent of the first portion of image content and is responsive to an action by the user that indicates at least an interest in or focus on the one or more second portions of image content.

12 Claims, 30 Drawing Sheets

(56) References Cited

U.S. PATENT DOCUMENTS

| | | |
|---|---|---|
| 7,961,963 B2 | 6/2011 | Sun |
| 8,798,136 B2 | 8/2014 | Kelly |
| 8,855,195 B1 | 10/2014 | Kelly |
| 9,253,013 B1 | 2/2016 | Kolam et al. |
| 9,509,764 B1 | 11/2016 | Kolam |
| 9,584,701 B2 | 2/2017 | Kelly |
| 9,774,761 B2 | 9/2017 | Kelly |
| 9,953,014 B1 | 4/2018 | Reshadi et al. |
| 10,009,439 B1 | 6/2018 | Kolam |
| 10,178,147 B1 | 1/2019 | Kolam |
| 10,462,495 B2 | 10/2019 | Hachfeld |
| 10,554,856 B2 | 2/2020 | Kelly |
| 11,089,338 B2 | 8/2021 | Hachfeld |
| 2004/0230613 A1 | 11/2004 | Goldstein et al. |
| 2006/0039472 A1 | 2/2006 | Barbarien et al. |
| 2006/0071825 A1 | 4/2006 | Demos |
| 2006/0210185 A1 | 9/2006 | Sun |
| 2008/0144962 A1 | 6/2008 | Jung et al. |
| 2009/0002397 A1* | 1/2009 | Forlines ......... H04N 21/440263 345/660 |
| 2010/0008595 A1 | 1/2010 | Riley et al. |
| 2013/0162678 A1* | 6/2013 | Harris ....................... G06F 3/14 345/634 |
| 2013/0229436 A1 | 9/2013 | Freyhult et al. |
| 2014/0286588 A1 | 9/2014 | Kelly |
| 2015/0178946 A1 | 6/2015 | Krishnaswamy et al. |
| 2015/0178951 A1 | 6/2015 | Kelly |
| 2015/0237382 A1 | 8/2015 | Nishida et al. |
| 2015/0346969 A1* | 12/2015 | Strabbing ........... G06F 3/04845 715/723 |
| 2016/0373613 A1 | 12/2016 | Kelly |
| 2018/0188372 A1 | 7/2018 | Wheeler |
| 2019/0052913 A1 | 2/2019 | Hachfeld |
| 2019/0340730 A1 | 11/2019 | Dimitrov et al. |
| 2020/0029099 A1 | 1/2020 | Hachfeld |
| 2020/0177767 A1 | 6/2020 | Kelly |
| 2021/0049792 A1 | 2/2021 | Kelly |
| 2021/0051243 A1 | 2/2021 | Kelly |
| 2021/0051244 A1 | 2/2021 | Kelly |
| 2021/0058629 A1 | 2/2021 | Kelly |

FOREIGN PATENT DOCUMENTS

| | | |
|---|---|---|
| WO | 2015103646 A1 | 7/2015 |
| WO | 2019217754 A1 | 11/2019 |
| WO | 2019217756 A1 | 11/2019 |
| WO | 2019217756 A4 | 11/2019 |

OTHER PUBLICATIONS

Schwarz, Heiko, Marpe, Detlev and Wiegand, Thomas, "Overview of the Scalable Video Coding Extension of the H.264/AVC Standard", IEE Transactions on Circuits and Systems for Video Technology, vol. 17, No. 9, Sep. 9, 2007, pp. 1103-1120.

Unknown author(s), "Scalable Video Coding ", Wikipedia, May 4, 2011, downloaded from www.wikipedia.org on Sep. 29, 2011, 5 pages.

Unknown author(s), "H.264/MPEG-4 AVC", Wikipedia, Sep. 22, 2011, downloaded from www.wikipedia.org on Sep. 29, 2011, 5 pages.

Unknown author(s), "PALplus", Wikipedia, Jun. 10, 2012, downloaded from www.wikipedia.org on Aug. 21, 2012, 5 pages.

Kelly, Shawn L., "Posting and viewing ultra-high resolution photographs on Facebook using new HifiPix apps", brief description of YouTube video published on Mar. 5, 2015, https://www.youtube.com/watch?v=GzmfQp5g2OQ, in association with Kickstarter/Kicktraq fundraising from Mar. 21 to Apr. 20, 2015.

* cited by examiner

METHOD OF DISPLAYING A COMPOSITE IMAGE ON AN IMAGE DISPLAY

CROSS-REFERENCE TO RELATED APPLICATIONS

The instant application claims the benefit of both prior U.S. Provisional Application Ser. No. 63/002,341 filed on 30 Mar. 2020 and prior U.S. Provisional Application Ser. No. 63/029,388 filed on 22 May 2020, each of which is incorporated herein by reference in its entirety.

BRIEF DESCRIPTION OF THE DRAWINGS

FIG. 4a illustrates an example of an image display upon which is displayed an initial composite image comprising a picture image within a background image, wherein the picture image is displayed at an initial relatively-lower resolution;

FIG. 4b illustrates an image buffer containing the image data associated with the picture image portion of the composite image illustrated in FIG. 4a;

FIG. 5a illustrates a modification of the composite image illustrated in FIG. 4a in accordance with the process illustrated in FIG. 3 responsive to a user-selected zoom operation;

FIG. 5b illustrates an image buffer containing the image data associated with the picture image portion of the composite image illustrated in FIG. 5a;

FIG. 8a illustrates an image display with the composite image as illustrated in FIG. 4a, upon which is superimposed a used-selected region—for which the associated pixels are identified with the symbol "B"—that is to be zoomed to the full size of the image window;

FIG. 8c illustrates the pixels of the image buffer illustrated in FIG. 8b in relation to the source image;

FIG. 9a illustrates an image display with the composite image as illustrated in FIG. 8a after replacement of the picture image of FIG. 8a with the picture image illustrated in FIG. 8b, upon which is superimposed a further used-selected region—for which the associated pixels are identified with the symbol "C-"—that is to be zoomed to the full size of the image window;

FIG. 9b illustrates the image buffer associated with the image window resulting from the user-selected region illustrated in FIG. 9a, for which the associated pixel values are identified with the symbol "C'-";

FIG. 9c illustrates the pixels of the image buffer illustrated in FIG. 9b in relation to a portion of the source image;

FIG. 10 illustrates an image display with the composite image as illustrated in FIG. 9a after replacement of the picture image of FIG. 9a with the picture image illustrated in FIG. 9b;

FIG. 13j illustrates a schematic illustration of the composite image illustrated in FIG. 13h following reverse zooming from within the associated picture image thereof, resulting in a reversion to the original composite image illustrated in FIG. 13a;

FIG. 15f illustrates a schematic illustration of the composite image illustrated in FIG. 15e following a reverse zoom from within the associated picture image thereof, resulting in a reversion to the original composite image illustrated in FIG. 15a;

FIG. 17i illustrates a schematic illustration of a reverse-zoomed version of the composite image illustrated in FIG. 17h, reverse-zoomed from within the background image portion thereof, resulting in a reversion to the original composite image illustrated in FIG. 17a.

DESCRIPTION OF EMBODIMENT(S)

A variety of electronic information display applications exist whereby users can directly interact with an actual and/or generated image displayed within a region—referred to as an "image window"—of the displayed information, whereby, as a response to such direct interaction, particularly zooming, the application can download and/or generate higher resolution detail for a magnified presentation of that image within that image window. Popular examples of such applications include Google Maps or the more general use of a HyperText Markup Language (HTML) Canvas window for a wide variety of programmable applications. However, such direct interaction within an image window can significantly interfere with user interaction intended for more macroscopic manipulation of the entirety of displayed information exterior to but including that window, such as, for example, internet browser webpage pan and zoom interactions through a mouse or touchpad interface or through display screen touch gestures. As an example of such interference, if one were able to pan or zoom within an image window for the purpose of panning or magnifying the image within that window when using an electronic information display application without the below-described means for on-demand image enhancement, such interactions typically inconveniently disable the capability to pan or zoom the entire displayed information area including that image window, wherein browser webpage pan and zoom interactions, and in general those of information displays, would otherwise typically take precedence over pan and zoom operations on image content within image windows that are part of the displayed information, which subsequently prevents potentially desirable interaction with the image content itself other than simple single touch or click operations which do not smoothly support panning and zooming of that content. Furthermore, otherwise limiting zoom to the more macroscopic display of information itself—such as when a full webpage typically just scales up images within their expanded image windows without actually adding detail or true content resolution—can result in expanded images which would be relatively blurry if sufficient resolution is not already inherent in those images to support the increased available display resolution within the expanded image window. The use of initial relatively-high-inherent-quality images—e.g. relatively high resolution images—to prevent zooming-induced blurriness would otherwise require either a relatively high bandwidth to avoid delays when downloading the image, or relatively longer image transmission times when bandwidth is limited, which can cause inconvenience to, or a waste of time, of the user; or a waste of bandwidth if the relatively-higher quality image content is not ultimately used by the user.

Figure 1:
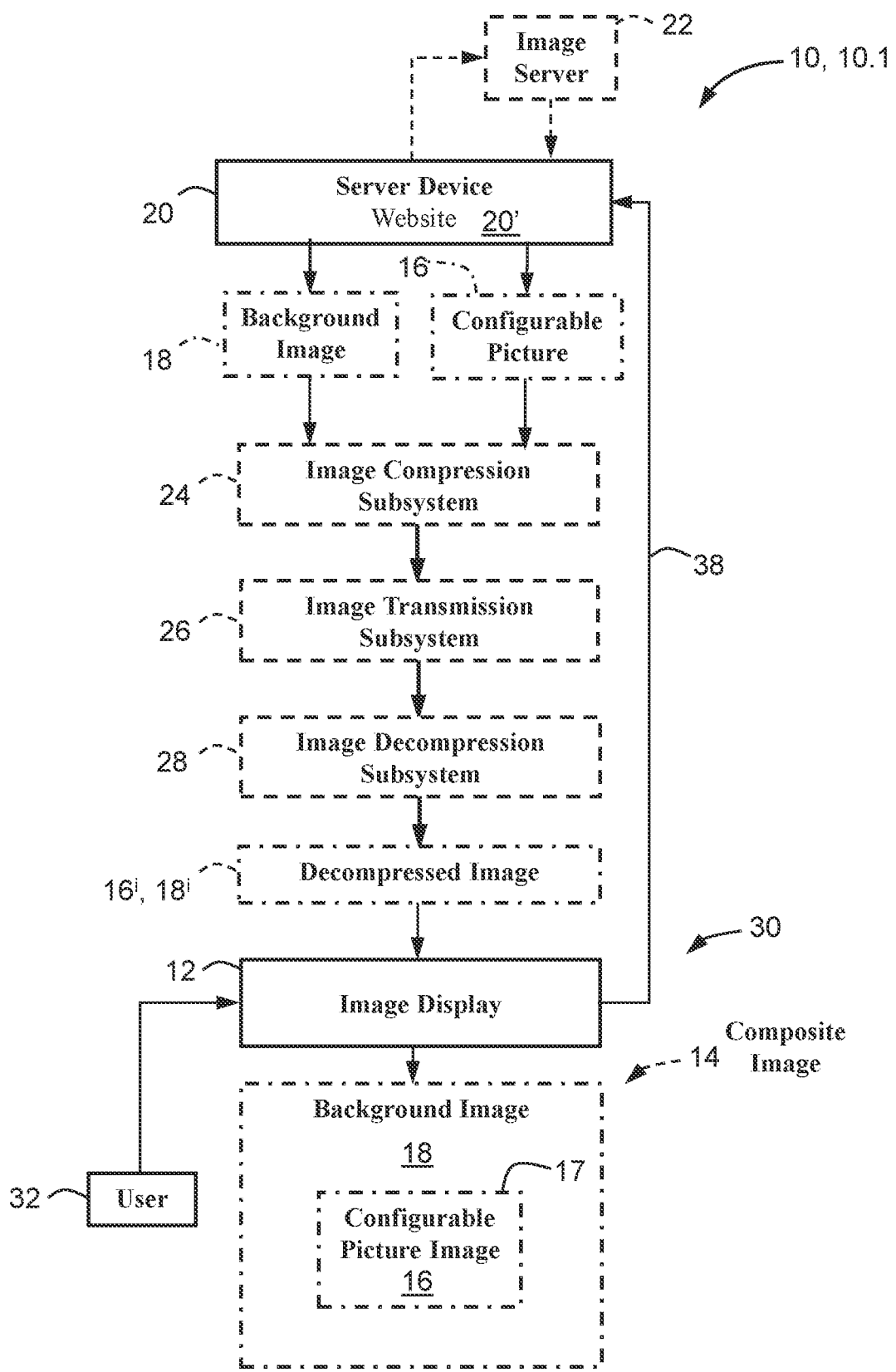
FIG. 1 illustrates a first embodiment of a system that provides for a composite of a background image and a configurable picture to be transmitted to and displayed on an image display, wherein the configurable picture can be modified with supplemental or replacement image data independently of modifications to the background image on an associated image display.
Figure 2:
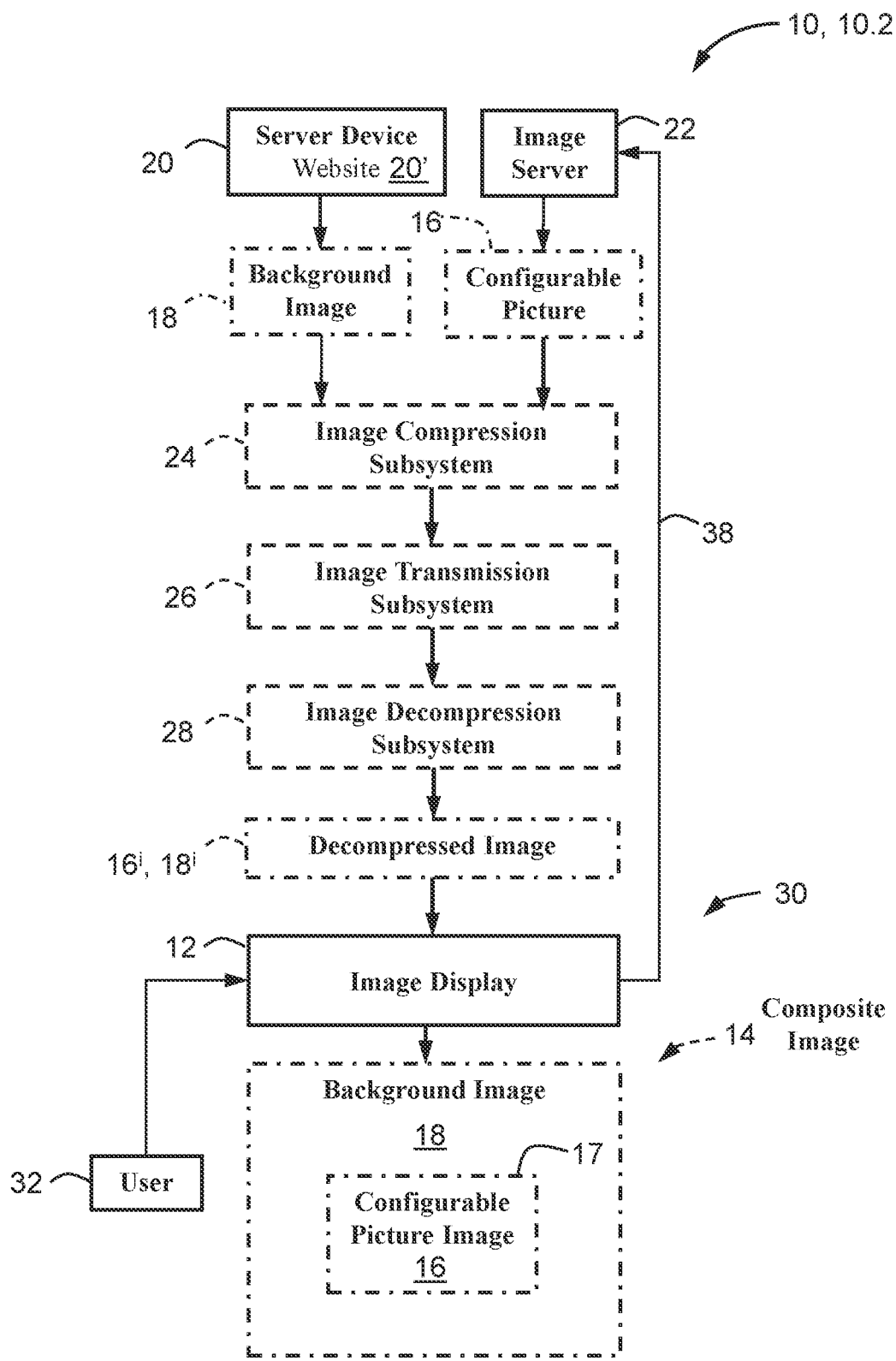
FIG. 2 illustrates a second embodiment of a system that provides for a composite of a background image and a configurable picture to be transmitted to and displayed on an image display, wherein the configurable picture can be modified with supplemental or replacement image data independently of modifications to the background image on an associated image display.

Referring to FIGS. 1 and 2, an image processing system 10 provides for displaying, on an associated image display 12, a composite image 14 that incorporates a configurable picture image 16 withing a region—referred to herein as an image window 17—of an associated background image 18, wherein the background image 18 image is downloaded both from an associated server device 20—for example, a website 20' operated therefrom—and the configurable picture image 16 is downloaded either from the same or from a separate source.

For example, in accordance with a first embodiment 10.1 of the image processing system 10, 10.1 illustrated in FIG. 1, the configurable picture image 16 is downloaded from the same server device 20 that supplied the background image 18, whereas in accordance with a second embodiment 10.1 of the image processing system 10, 10.2 illustrated in FIG. 2, the configurable picture image 16 is downloaded from a separate image server 22, the latter of which might be alternatively used as a source of the configurable picture image 16 to the server device 20 of the first embodiment 10.1. In accordance with one set of embodiments and conventional practice, the configurable picture image 16 and the background image 18 may be transmitted to the image display 12 following compression by an associated image compression subsystem 24, subsequent transmission by an associated image transmission subsystem 26, and subsequent decompression by an associated image decompression subsystem 28, the latter of which generates corresponding decompressed versions of the configurable picture 16' and background 18' images that are input to the image display 12. In one set of embodiments—for example, as illustrated in FIGS. 1 and 2—both the configurable picture 16, 16' and background 18, 18' images are processed by the same set of image compression 24, image transmission 26 and image decompression 28 subsystems. Alternatively, each of the configurable picture 16, 16' and background 18, 18' images could be separately processed by a corresponding separate set of image compression 24, image transmission 26 and image decompression 28 subsystems.

Figure 3:
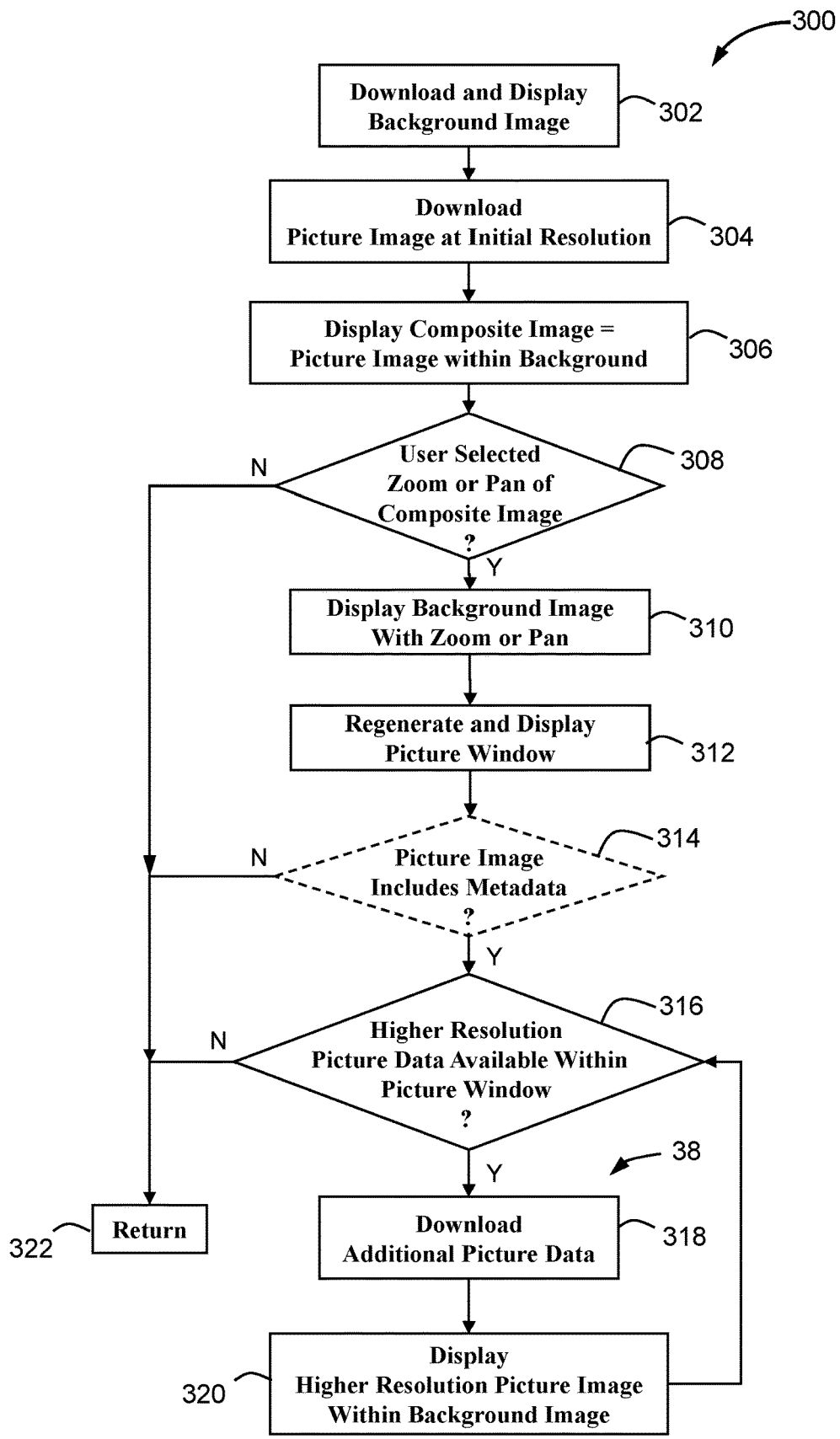
FIG. 3 illustrates first and third aspects of a process for forming a composite of a background image and an associated picture image within the background image, and for downloading additional image data to provide for displaying a higher resolution picture image if the picture image includes metadata indicating that the additional image data is available, which also provides for a user-selected zoom or pan of the composite image.

Referring also to FIG. 3, in accordance with a first aspect of a display process 300 of the image processing system 10, 10.1, 10.2, an arrangement of formatted information such as, for example, a website webpage, is created using typical programming languages such as, for example, HyperText Markup Language (HTML), ultimately resulting in associated computer code representing said arrangement of formatted information resident on a server device 20 that provides for displaying a composite image 14 on an associated image display 12 of an associated client display device 30, wherein the composite image 14 includes configurable picture image 16 within an associated background image 18. The computer code is thereafter transmitted to, and received by, the client display device 30 requesting that computer code, and the arrangement of formatted information represented by that computer code is thereafter presented on the image display 12 of the client display device 30 by an associated display application, for example, a web browser. That arrangement of formatted information includes one or more initial digital images having an inherent initial digital dimension measured in pixels, that provides a measure of an associated "resolution". The initial image resolution of at least the configurable picture image 16 is less than the maximum available resolution thereof on the server device 20, for example, as a result of producing and storing such initial images as scaled-down or otherwise subsampled representations of original higher resolution images resident on the server device 20. Each initial image is electronically scaled by the display application as necessary to fit within and to match the resolution of a respective image window 17 within the arrangement of formatted information when displayed on the associated image display 12. The display application on the client display device 30 incorporates a means—referred to as "zooming" or "magnifying", including, for example, actions by an associated user 32 of the client display device 30 including, but not limited to, pinch-to-zoom touch gestures, mouse and pointing device events, rotation of the device to change the device display format, clicking on related webpage or browser buttons or otherwise directly modifying the display application zoom level—for expanding the displayed arrangement of formatted information to provide increased resolution per unit area of the visually displayed content of the displayed arrangement. The display application on the client display device 30 may also incorporate a means—referred to as "panning"—for translating the composite image 14 on the image display 12 in any direction.

Following the initial download of a relatively-lower resolution configurable picture image 16 to provide for a relatively-faster associated download speed, upon action by the user 32 to indicate an intention to modify, or to have immediate interest in, or focus on, the configurable picture image 16, additional, or replacement, image data that will provide for a relatively-high-resolution configurable picture image 16 is then downloaded "on-demand" in response to the specific interaction by the user 32 with the displayed information, thereby providing for limiting the associated demand for relatively-higher bandwidth to that of the image content of interest to the user 32.

More particularly, as an example, referring to FIG. 3, in step (302) the computer code associated with the background image 18 is downloaded by the client display device 30 from the server device 20, and the background image 18 is displayed on the image display 12 by the associated display application. In step (304), the computer code associated with an initial, relatively-lowest-resolution configurable picture image 16 is downloaded by the client display device 30 from the server device 20, and, in step (306), the relatively-lowest-resolution configurable picture image 16 is displayed on the image display 12 by the associated display application. It should be understood that steps (302) and (304) could be performed in any order, or simultaneously if feasible.

Figure 4A:
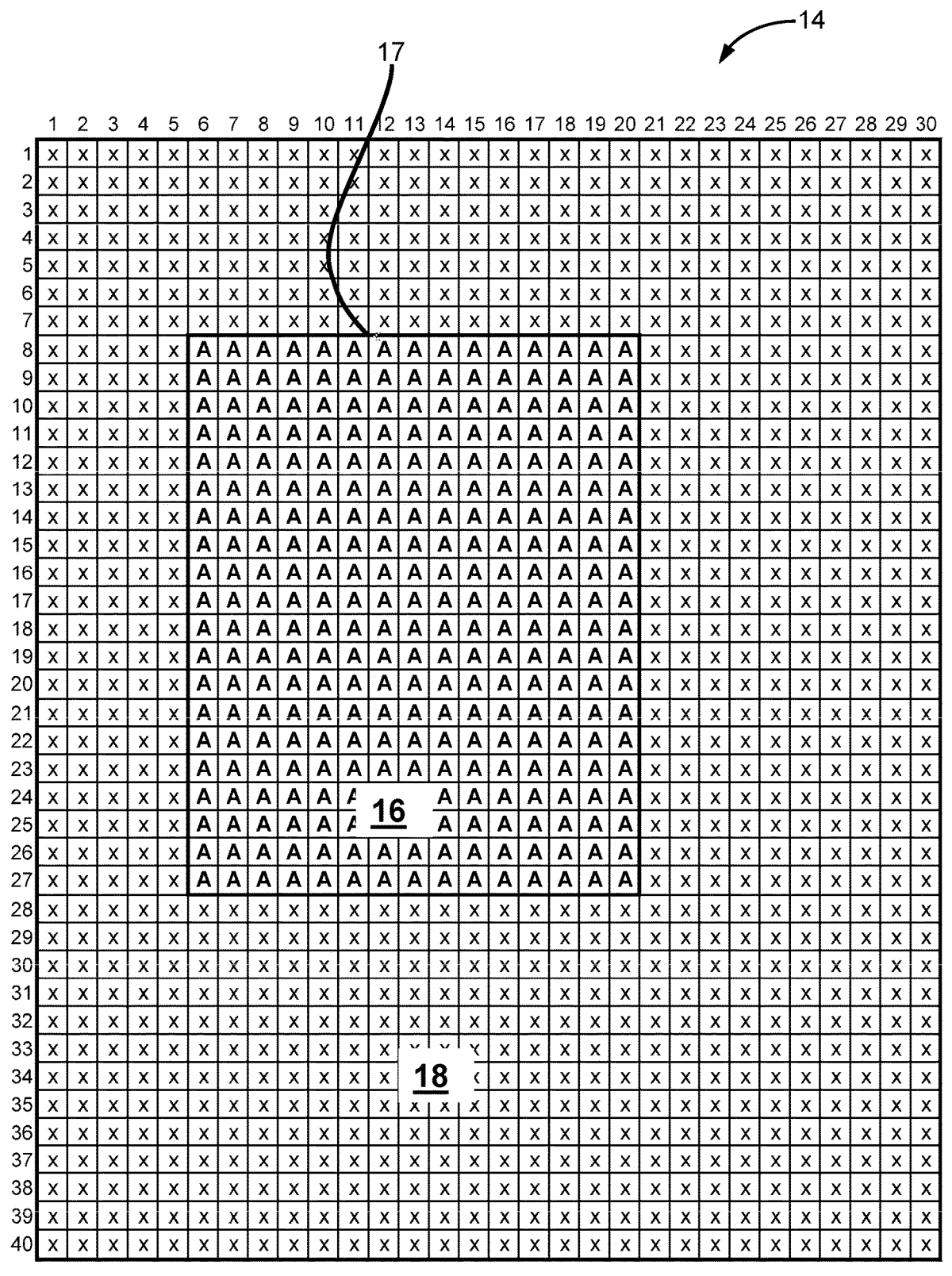
Figure 4B:
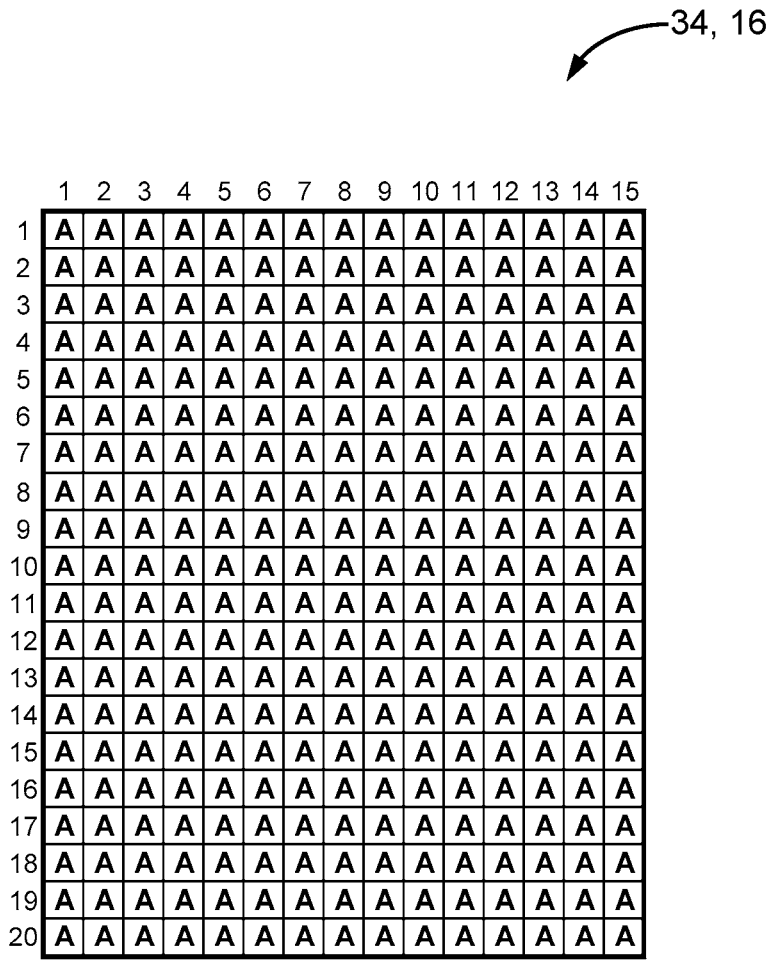
Figure 4C:
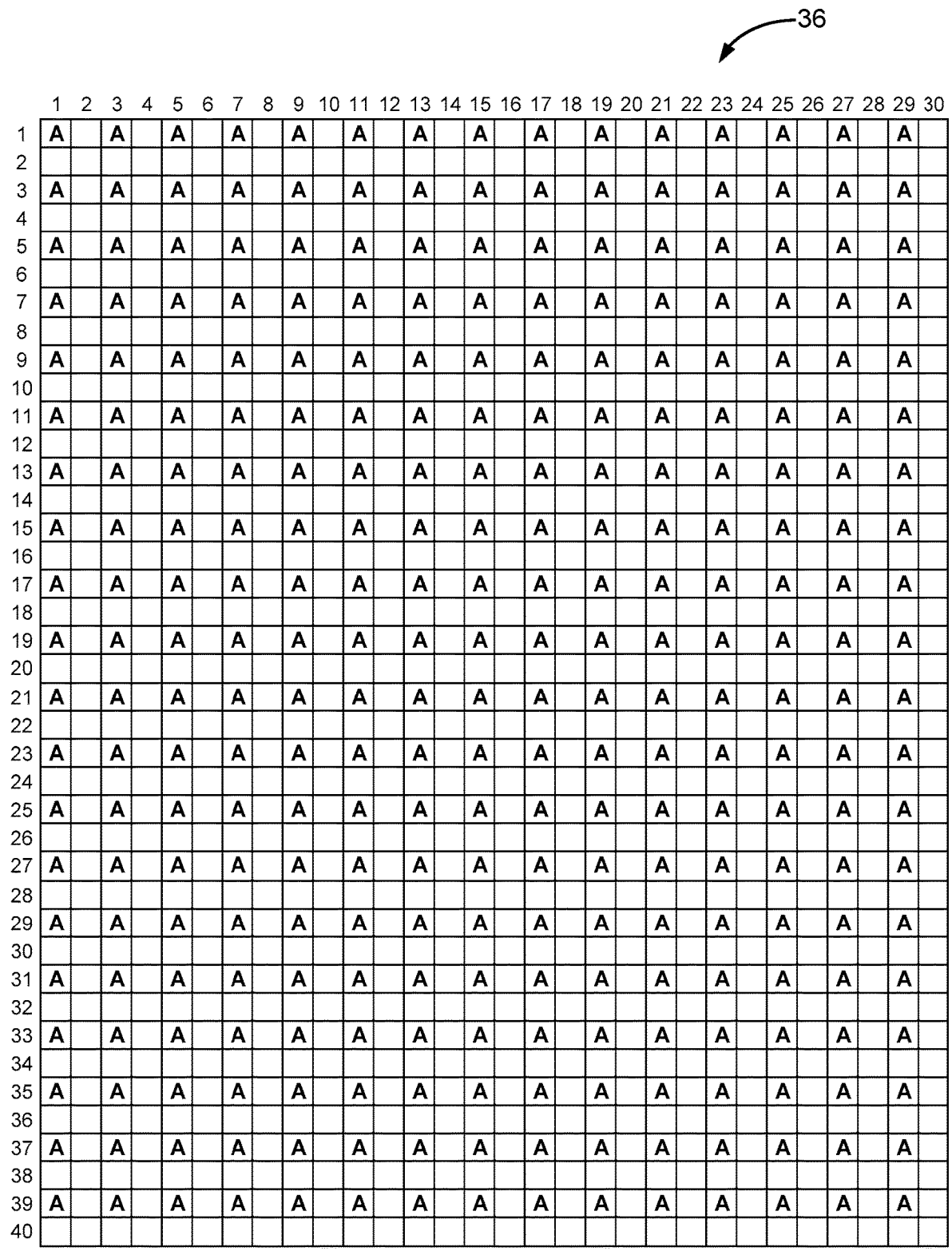
FIG. 4c illustrates an underlying source image from which the picture image illustrated in FIGS. 4a and 4b has been extracted or derived, wherein each cell corresponds to at least one image pixel, and the cells labeled with the symbol "A-" represent the associated image content illustrated in FIGS. 4a and 4b.

For example, referring to FIGS. 4a through 4c, a composite image 14 comprising a pixel array of 40 rows and 30 columns is illustrated in FIG. 4a, for which the pixels associated with the background image 18 portion are indicated with "x" symbols, and the pixels associated with the initial configurable picture image 16 portion are indicated with "A-" symbols. Referring to FIGS. 4b and 4c, in one set of embodiments, the pixels of the configurable picture image 16 are mapped to an associated image buffer 34 that is populated with image content from an associated source image 36 stored on either the server device 20 or the image server 22, depending upon the configuration of the image processing system 10, 10.1, 10.2. For example, for the source image 36 illustrated in FIG. 4c, every other pixel with respect to both rows and columns—e.g. the pixels indicated with the "A-" symbol in FIG. 4c— is transmitted by the image server 22 and received by the client display device 30 as the initial configurable picture image 16 that is downloaded into the image buffer 34 and incorporated in the composite image 14 for display on the image display 12, and the remaining pixels—the pixels that are blank in FIG. 4c— contain additional detail of the source image 36. In this example, the initial configurable picture image 16—containing only 25% of the number of pixels of the source image 36—can be received by the client display device 30 about four times faster than the entire source image 36. Accordingly, by initially displaying a relatively-lower-resolution configurable picture image 16, an approximation of the associated image content can be presented to the user 32 relatively quickly.

Referring again to FIG. 3, following the display of the composite image 14 with the initial configurable picture image 16, the user 32 may interact with the image display 12 to provide for modifying the presentation of the composite image 14, for example, so as to provide for either panning or zooming/magnifying the composite image 14. More particularly, in step (308), if the user 32 has commanded either a zoom or pan of the composite image 14, then, in step (310) the background image 18 is panned or zoomed responsive to the command from the user 32—for example, via either touch, mouse, or other pointing device—and in step (312) the configurable picture image 16 is regenerated within the associated picture region/image window 17 of the composite image 14. For example, if the composite image 14 is simply panned or rotated by the user 32, then then image content of the associated composite image 14 will remain unchanged, but will also be panned or rotated.

Figure 5A:
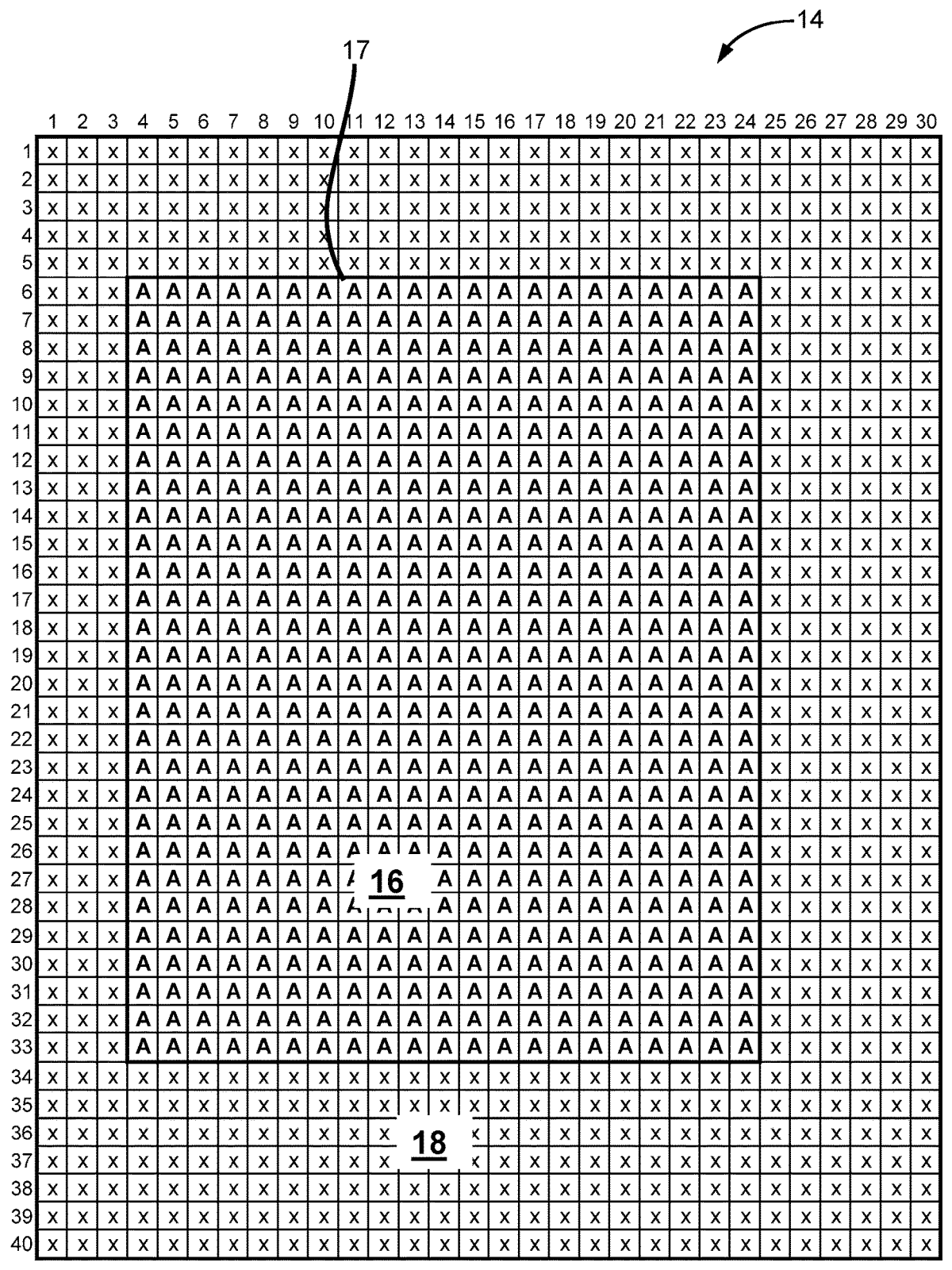
Figure 5B:
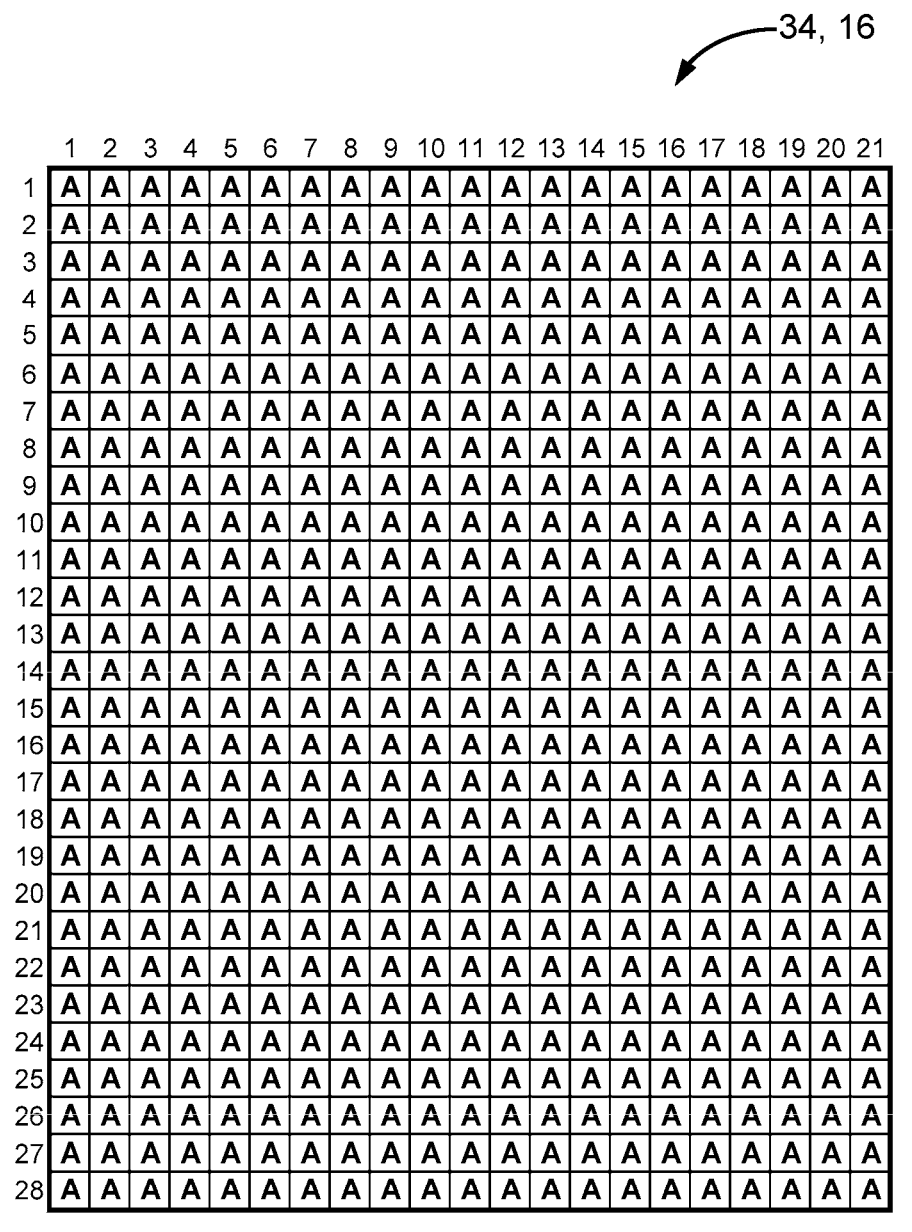
Figure 6:
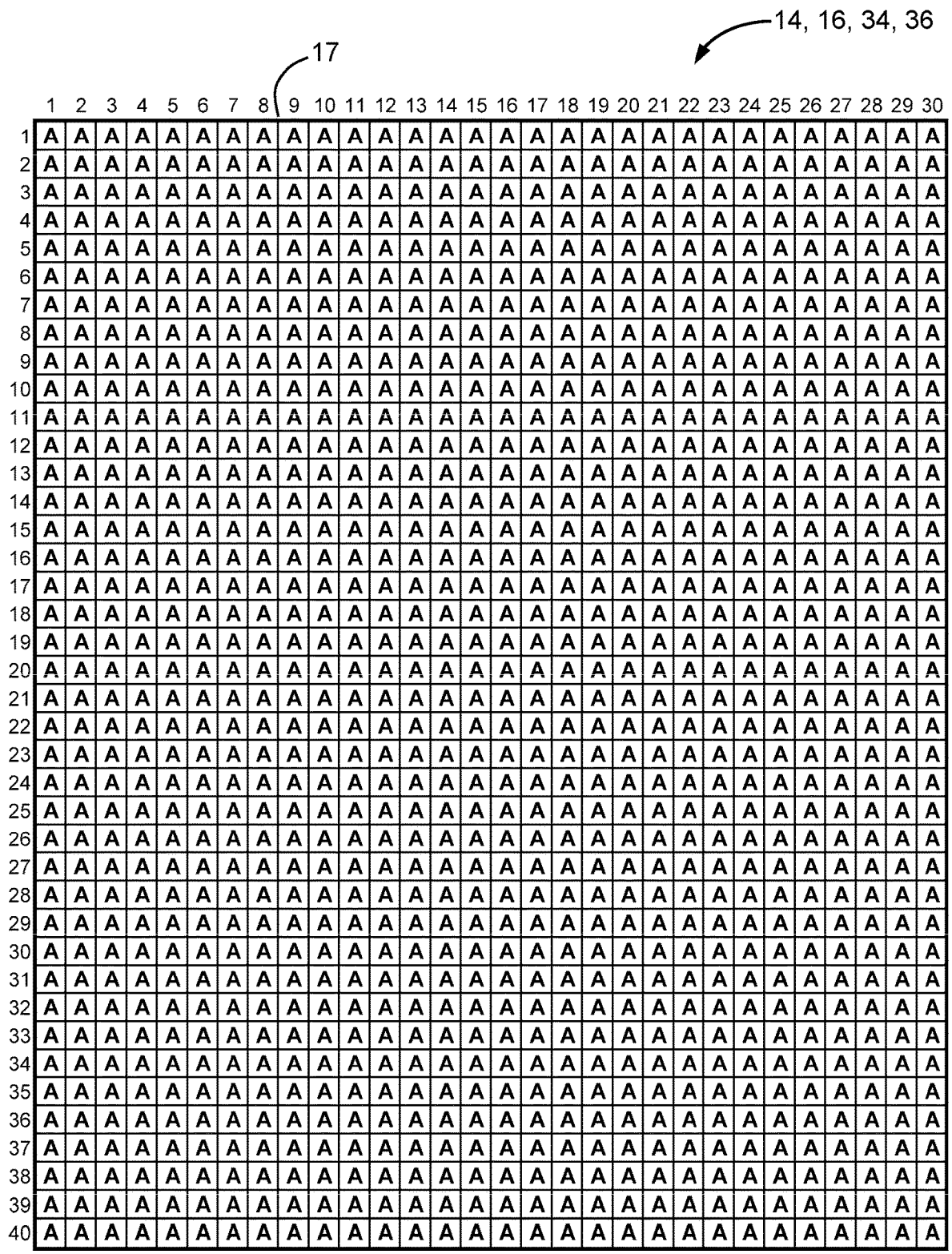
FIG. 6 illustrates a modification of the composite image illustrated in FIGS. 4a and 5a in accordance with the process illustrated in FIG. 3 responsive to a user-selected zoom operation, wherein the composite image has been magnified to the extent that only the associated picture image is displayed, and further illustrates the associated underlying source image and the associated picture-image buffer.

However, if composite image 14 is magnified, zoomed or rescaled, then the associated picture region/image window 17 will be repopulated with an associated configurable picture image 16 that is commensurate with the resulting modified picture region/image window 17. For example, referring to FIG. 5a, responsive to a combination of a panning and zooming of the composite image 14 by the user 32, the picture region/image window 17 of the configurable picture image 16 within the composite image 14, relative to that illustrated in FIG. 4a is shifted upwards and to the left on the image display 12, and the size of the picture region/ image window 17 and the associated configurable picture image 16 is expanded from 20 rows by 15 columns to 28 rows by 21 columns, corresponding to a magnification of 140%. Referring to FIG. 5b, the configurable picture image 16 is regenerated, for example, either locally by the client display device 30, for example, by an interpolation of the configurable picture image 16 prior to the pan and zoom operation, or by interaction 38 with either the server device 20 or the image server 22 to request and download a revised version of the configurable picture image 16 that is scaled to fit the modified picture region/image window 17 within the composite image 14. Referring to FIG. 6, the composite image 14 may be further magnified, for example, with the picture region/image window 17 with the configurable picture image 16 expanded to fill the entirety of the visible portion of the composite image 14 on the image display 12, wherein FIG. 6 illustrates each of the composite image 14, the image buffer 34, and the associated source image 36, and the image buffer 34 is populated with the full-resolution source image 36—illustrated also in FIG. 4c responsive to an interaction 38 of the client display device 30 with the server device 20 to provide for requesting and downloading additional picture data—i.e. either a replacement configurable picture image 16 or supplemental image data that provides for generating the full-resolution source image 36 from the previously-downloaded version of the configurable picture image 16.

Referring again to FIG. 3, following step (312) if there was a user-selected zoom or pan, then—optionally via step (314) described more fully hereinbelow—in step (316), if higher-resolution picture data if available for the configurable picture image 16—i.e. if the resolution of the source image 36 on the server device 20 is higher than that of the previously-downloaded configurable picture image 16—then, in step (318), additional picture data is downloaded by the client display device 30 from the server device 20, and a corresponding relatively-higher resolution configurable picture image 16 is stored in the image buffer 34 for inclusion in the composite image 14, for example, as illustrated by the evolution of the configurable picture images 16 illustrated in FIG. 6 in relation to those illustrated in FIGS. 4a and 4b, and, by a comparison of the corresponding source images 36 illustrated in FIGS. 4c and 6, which would also apply to the case where the size of the picture region/image window 17 of the composite image 14 remains fixed with pixels of the initial configurable picture image 16 intermediate to those indicated with the symbol "A-" containing an approximate value that is subsequently replaced with a corresponding exact value from the source image 36. Then, in step (320), the modified composite image 14 is displayed on the image display 12 by the client display device 30, after which the display process 300 continues with repetition of step (316) et seq until either further higher resolution picture data is no longer available, or until terminated by the user 32, after which, or from step (308) if there was no user-selected zoom or pan, in step (322), the display process 300 returns control.

Referring to FIGS. 7-10, in accordance with a second aspect of a display process 700, the image processing system 10, 10.1, 10.2 and the associated display process 700 provides for the computer code received by the display application on the client display device 30 to further includes a process for downloading additional digital files responsive to a zooming event and thereafter, if and once available, for applying those additional files to increase the inherent resolution of those initial images within their respective expanded image windows 17 within the similarly expanded arrangement of formatted information, either by direct substitution of each initial image with a additionally downloaded higher resolution image, or by other known methods of increasing the resolution of an initial image using additional downloaded data. The associated resulting higher resolution can be to the maximum possible extent as provided by the corresponding files resident on the server device 20, or alternatively, limited or otherwise responsive to the resolution of the enlarged image window 17 resulting from the user zoom interaction; but it any case is limited to the maximum resolution of the image data resident on the server device 20.

Figure 7:
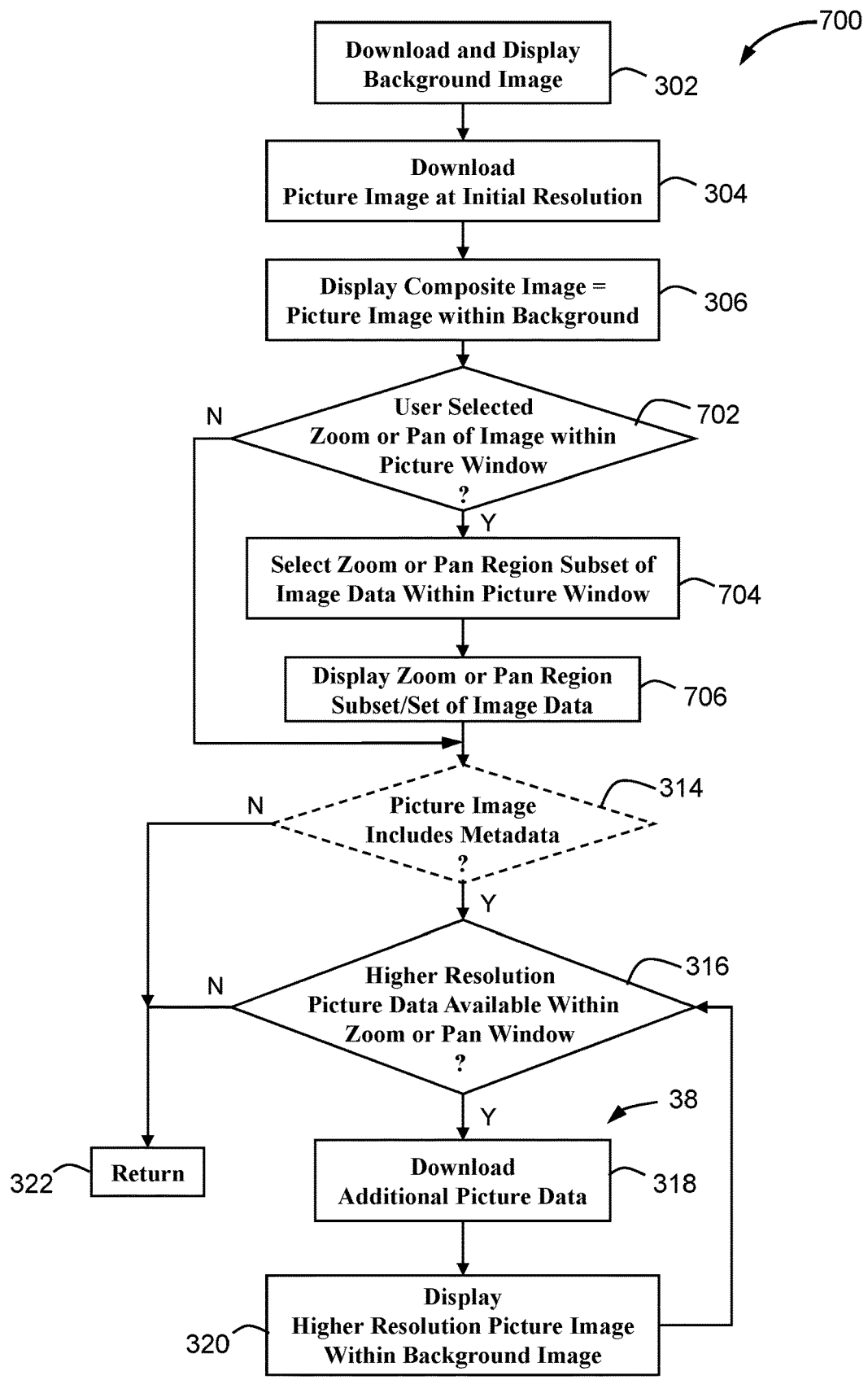
FIG. 7 illustrates second and third aspects of a process for forming a composite of a background image and an associated picture image within the background image, and for downloading additional image data to provide for displaying a higher resolution picture image if the picture image includes metadata, which provides for downloading the additional image data for pixels associated with a zoomed or panned image window.

More particularly, referring to FIG. 7, in accordance with one set of embodiments, the second-aspect display process 700 commences with downloading and displaying the background image 18 and an initial resolution configurable picture image 16 in steps (302) through (306), the same as for the above-described first-aspect display process 300. Then, in step (702), if user 32 has initiated a zooming or panning of the composite image 14, then, in step (704), the client display device 30 makes a request for image data for the associated zoom or pan region within the source image 36, and that data is downloaded from the server device 20, which is then, in step (706), displayed on the image display 12 of the client display device 30. Following step (706), the remaining steps (314) through (322) of the second-aspect display process 700 are the same as the like-numbered steps of above-described the first-aspect display process 300.

Accordingly, the second-aspect display process 700 provides an improved method for supporting zooming operations on an information display by providing for utilizing typical lower resolution images upon initial load of the displayed information for the fastest loading speed, followed by an improvement of such images with higher resolution upon an attempted zooming event, thereby requiring higher bandwidth downloading for such higher resolution only "on-demand" in response to a user's interaction with the displayed information.

Figure 8A:
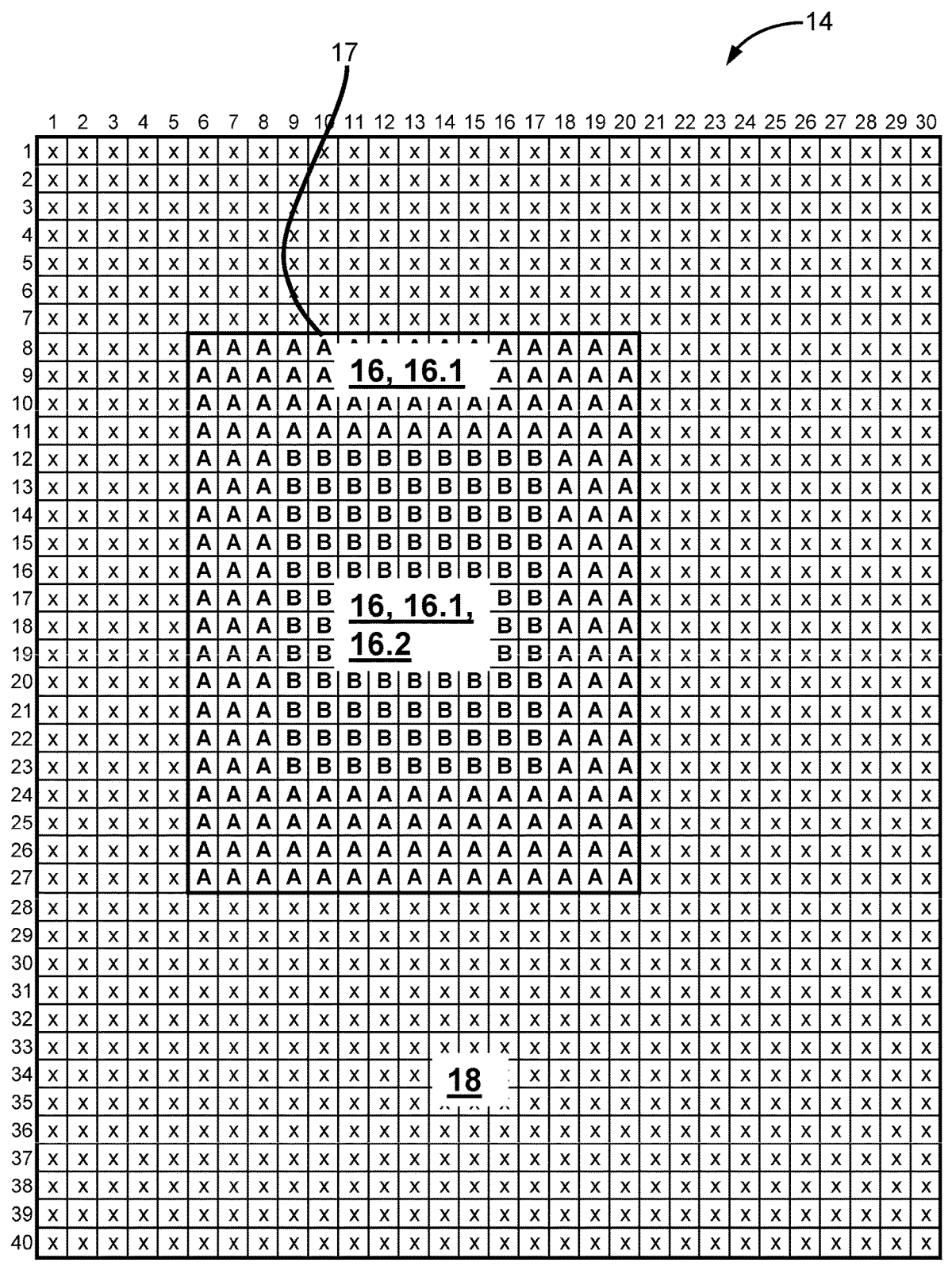
Figure 8B:
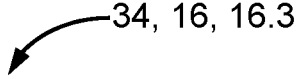
FIG. 8b illustrates the image buffer associated with the image window resulting from the user-selected region illustrated in FIG. 8a, for which the associated pixel values are identified with the symbol "B'-"

For an example of a zooming operation, referring to FIG. 8a, in step (704) of the second-aspect display process 700, the initially-displayed configurable picture image 16, 16.1 within the displayed pixels of the associated picture region/image window 17 of the composite image 14 are indicated with the symbol "A-", and include the pixels therewithin that are indicated with the symbol "B-", the latter of which indicate those pixels of the initially-displayed-portion 16.1 of the configurable picture image 16, 16.1 that have been selected by the user 32 as a to-be-zoomed portion 16.2 of the configurable picture image 16, 16.2. Referring to FIG. 8b, the zoomed image data 16.3 from the source image 36 associated with the to-be-zoomed portion 16.2 of the configurable picture image 16, 16.2—at a relatively-higher resolution than the initially-displayed, to-be-zoomed portion 16.2 of the configurable picture image 16, 16.2—is downloaded from the server device 20 to the image buffer 34 of the client display device 30 and included in the associated composite image 14 that is displayed on the image display 12. In FIG. 8b, the pixels of the zoomed image data 16.3 of the associated zoomed configurable picture image 16, 16.3 are indicated with the symbol "B'-".

Returning again to FIG. 8b, upon downloading additional image data—either replacement or supplemental—in either of steps (706) or 318), in accordance with a first embodiment of the second-aspect display process 700, once the user 32 has indicated an intention to modify, or to have immediate interest in or focus on, the configurable picture image 16, the relatively-higher resolution data of the source image 36 is downloaded for the entire source image 36, which provides for relatively rapid subsequent panning of the resulting zoomed configurable picture image 16, 16.3. Whereas the first embodiment of the second-aspect display process 700 provides an improved method for creating, transmitting and displaying a formatted arrangement of information supporting zooming of the displayed information to increase the resolution of images therein, thereby minimizing the bandwidth and load time until and unless such zooming occurs, and providing for much greater speed due to the relatively-lower resolution of the initial images, the downloading of relatively-higher-resolution image data for the entire source image 36 responsive to a zoom event can in some cases still result in a substantial delay, particularly when perhaps only a limited region of the source image 36—for example, limited to that encompassed within the initially-displayed-portion 16.1 of the configurable picture image 16, 16.1—may be of current interest to the user 32.

In accordance with a second embodiment of the second-aspect display process 700, in order to reduce delays associated with a zooming of the configurable picture image 16, once the user 32 has indicated an intention to modify, or to have immediate interest in or focus on, the configurable picture image 16, only image data associated with the subset of images within a formatted arrangement of information is increased in resolution upon a zoom event. For example, only those portions of the images that are at least partially visible on the client display device 30 at the time of zooming—for example, only image data associated with the picture region/image window 17 of the composite image 14—are selected for possible resolution increases, subject to the availability of their respective additional image data or associated files for those increases in resolution, while disregarding the remaining portions of the images—or associated image data—that are not visible at that time, thereby saving the associated download time or bandwidth, because at that time of zooming only this visible subset of images being likely to be of greatest interest to the user 32. For example, referring again to FIG. 8a, in accordance with the second embodiment of the second-aspect display process 700, the relatively-higher resolution data of the source image 36 is downloaded only for the portion of the source image 36 associated with the initially-displayed-portion 16.1 of the configurable picture image 16, 16.1.

In accordance with a third embodiment of the second-aspect display process 700, in order to further reduce delays associated with a zooming of the configurable picture image 16, and assuming that the user 32 is primarily interested in the to-be-zoomed portion 16.2 of the configurable picture image 16, 16.2, only image data associated with the to-be-zoomed portion 16.2 of the configurable picture image 16, 16.2—for example, only those initial images indicated by a mouse or touchpad cursor location or by the location of any finger touch event at the time of zooming—is downloaded from the server device 20 during either steps (704) or (318) of the second-aspect display process 700. Accordingly, the third embodiment of the second-aspect display process 700 can dramatically reduce the size of additional downloaded files that would be necessary to create such a higher resolution user experience, thereby dramatically increasing the associated speed at which the zoomed image data 16.3 is displayed. Although upon achieving a maximum zoom level in the display application, a user 32 interested in higher resolution images outside the picture region/image window 17 that have not yet been increased in resolution may be puzzled at the lack of higher resolution in those images given the already achieved state of maximum zoom, it is likely to be a natural inclination for that user 32 to apply the same zooming interaction on those images, even after having previously achieved a maximum zoom level, so that the attempt at zooming would trigger the downloading of additional image data in order to increase the resolution of the newly targeted images or portions thereof.

Figure 8C:
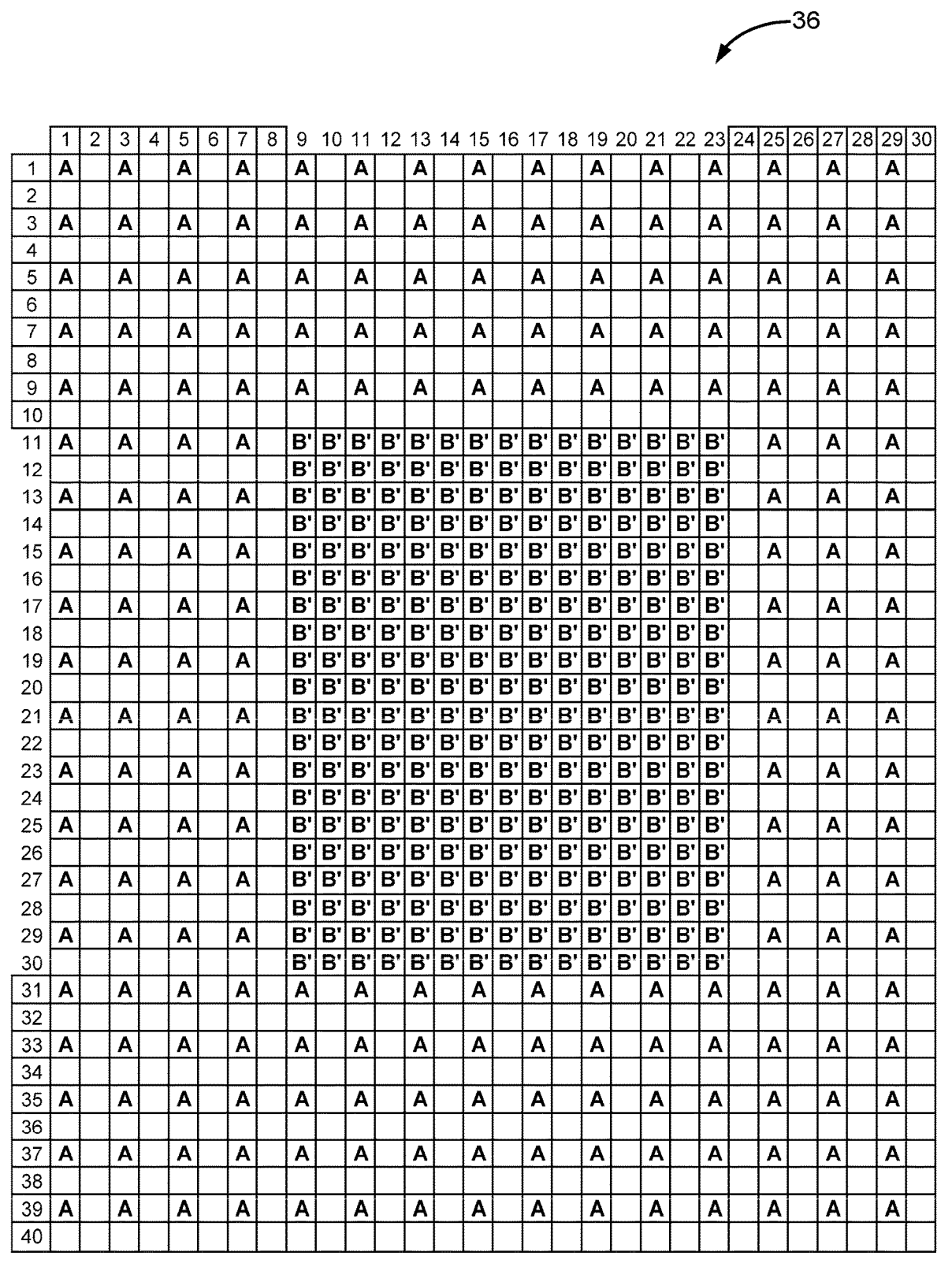
Figure 9A:
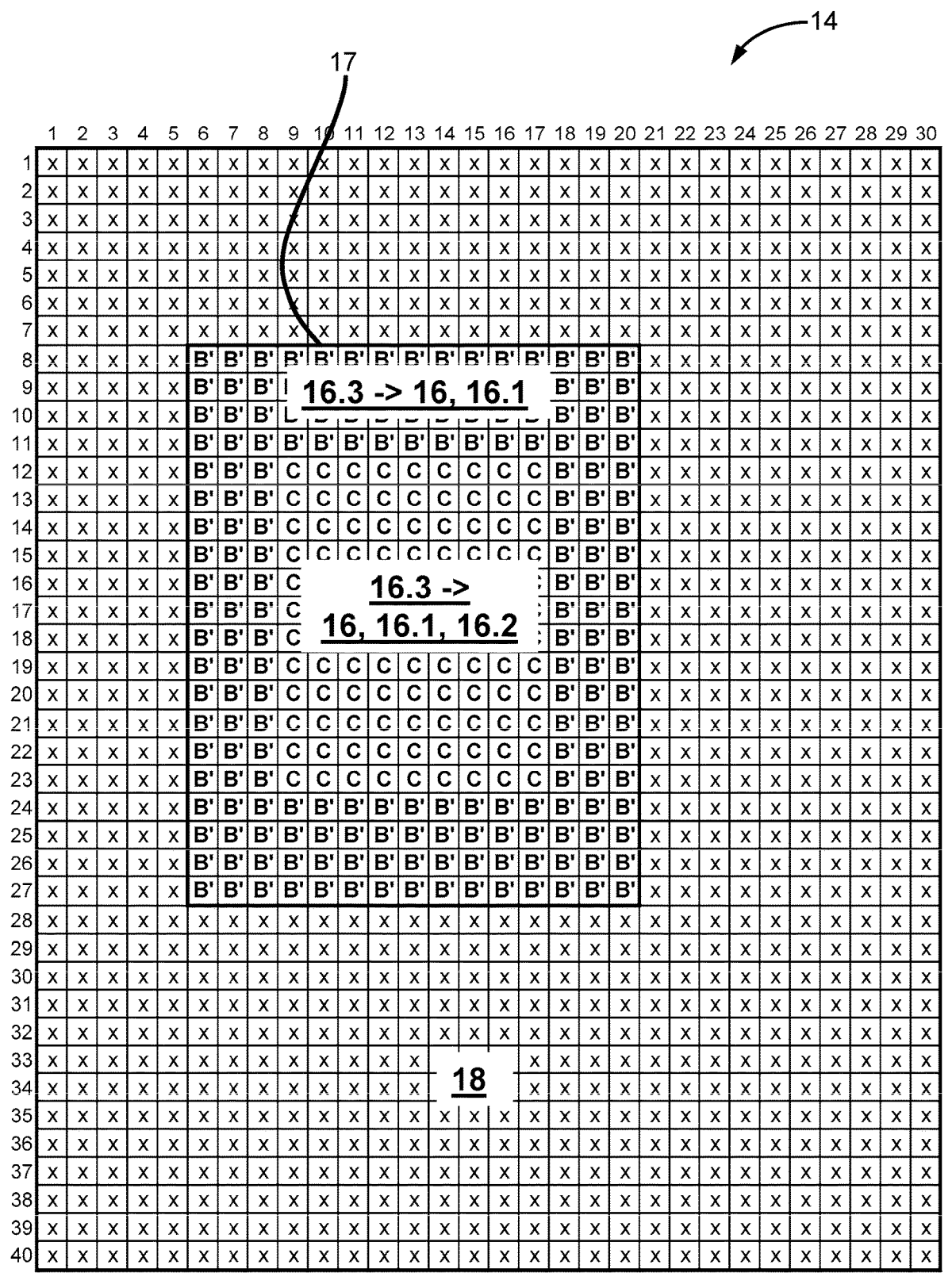

For example, referring to FIG. 8c, in accordance with the third embodiment of the second-aspect display process 700 for the to-be-zoomed portion 16.2 of the configurable picture image 16, 16.2 illustrated in FIG. 8a, and the corresponding zoomed image data 16.3 illustrated in FIG. 8b, in step (704), only the pixels—indicated with the symbol "B'-"—of the source image 36 associated with the to-be-zoomed portion 16.2 of the configurable picture image 16, 16.2, are downloaded by the client display device 30 from the server device 20 via the associated interaction 38 therewith, resulting in the incorporation of the zoomed configurable picture image 16, 16.3 in the associated composite image 14, for example, as illustrated in FIG. 9a, which illustrates a subsequent zooming of the previously zoomed image data 16.3 in accordance with steps (702) through (706) of the second-aspect display process 700.

Figure 9B:
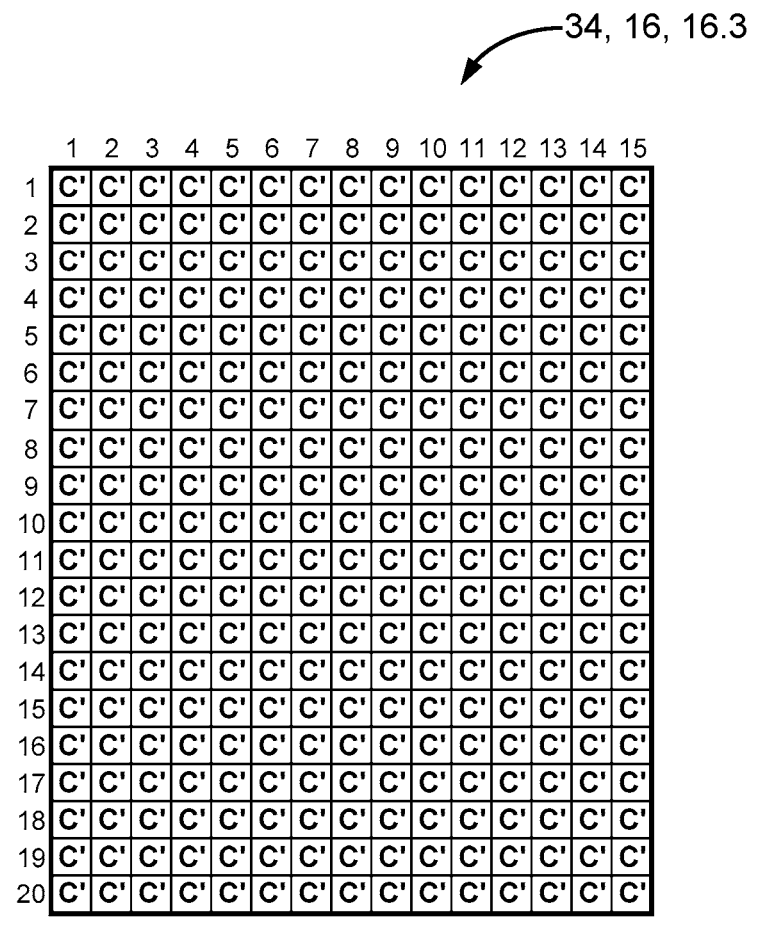
Figure 9C:
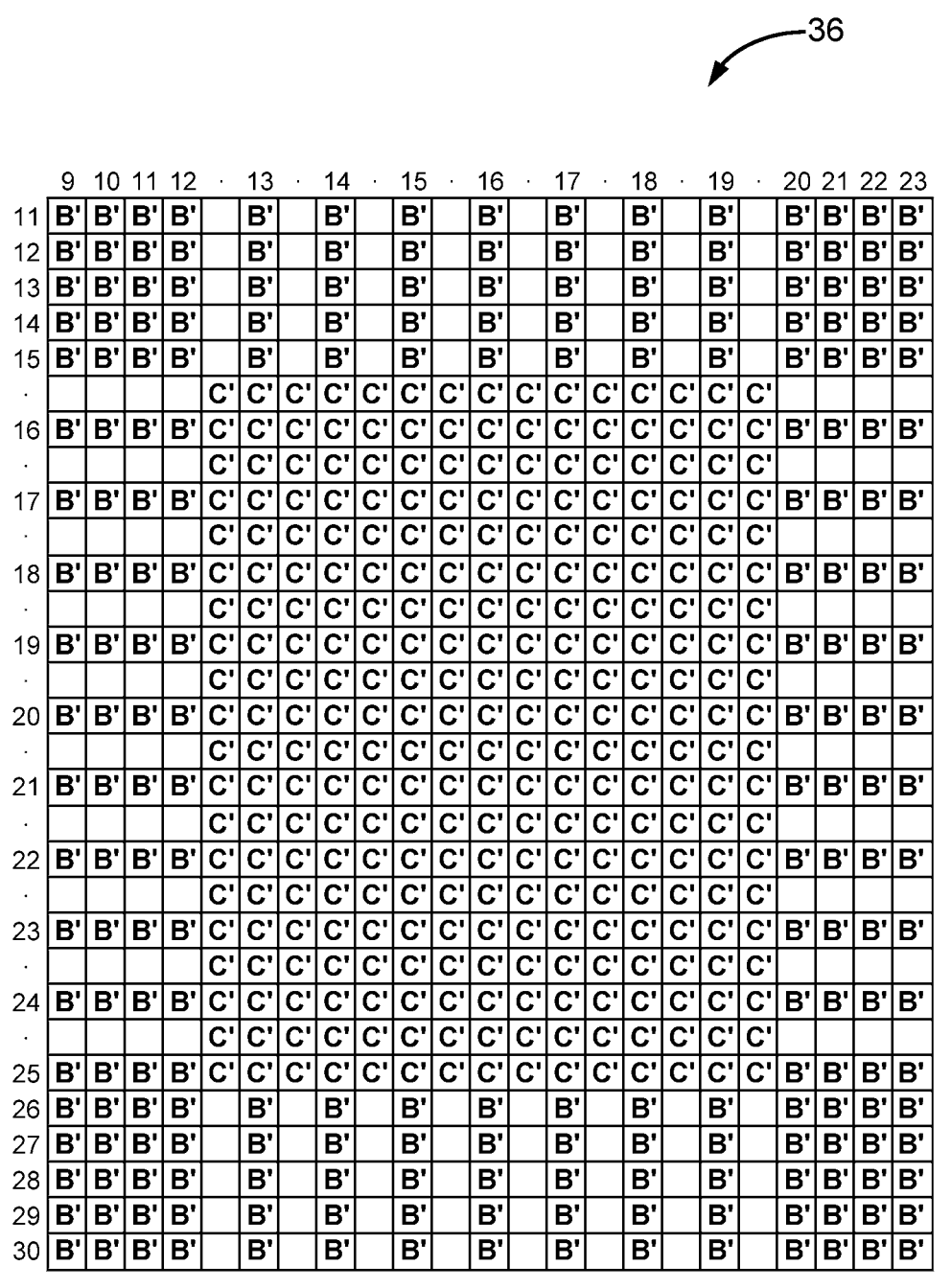
Figure 10:
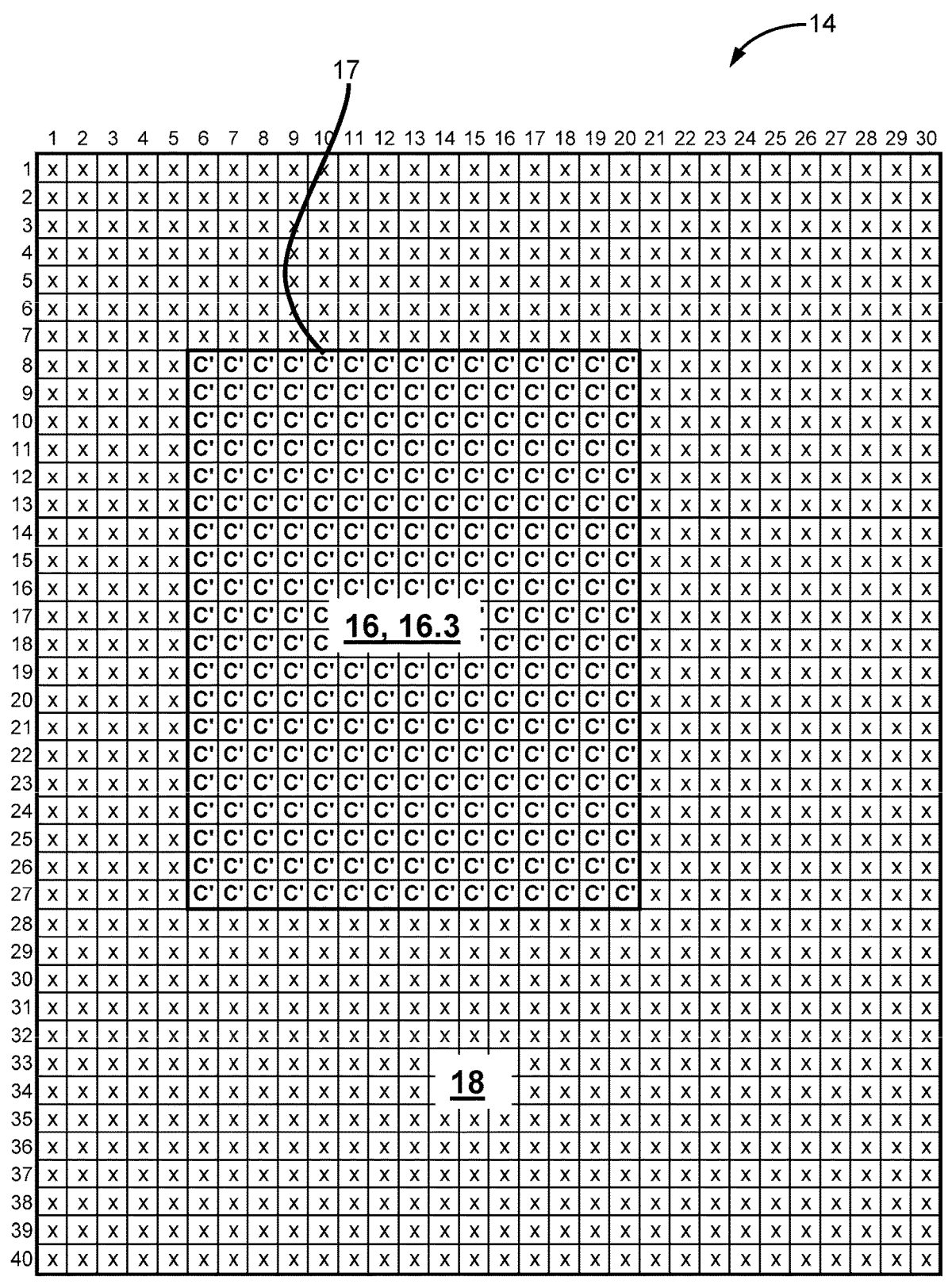

More particularly, in step (704), the pixels of the previously-zoomed configurable picture image 16, 16.3— now treated as an initially-displayed-portion 16.1 of the configurable picture image 16, 16.1—within the displayed pixels of the associated picture region/image window 17 of the composite image 14 are indicated with the symbol "B'-", and include the pixels therewithin that are indicated with the symbol "C-" of an associated to-be-zoomed portion 16.2 of the configurable picture image 16, 16.2 as selected by the user 32. Referring to FIG. 9*b*, the next zoomed image data 16.3 from the source image 36 associated with the to-be-zoomed portion 16.2 of the configurable picture image 16, 16.2—at a relatively-higher resolution than the initially-displayed, to-be-zoomed portion 16.2 of the configurable picture image 16, 16.2—is downloaded from the server device 20 to the image buffer 34 of the client display device 30 and included in the associated composite image 14 that is displayed on the image display 12. In FIG. 9*b*, the pixels of the zoomed image data 16.3 of the associated zoomed configurable picture image 16, 16.3 are indicated with the symbol "C'-". Referring to FIG. 9*c*—illustrating a portion of source image 36, the remaining portion of which is illustrated in FIG. 8*c*, —the corresponding zoomed image data 16.3 is downloaded by the client display device 30 from the server device 20 via the associated interaction 38 therewith, resulting in the incorporation of the newly zoomed configurable picture image 16, 16.3 in the associated composite image 14, for example, as illustrated in FIG. 10.

In accordance with one set of embodiments, the assumed interest of the user 32 can be taken for granted by further assuming that an intentional act of zooming on, or proximate to, a specific image or images suggests that the maximum amount of visible detail appropriate for the maximum possible zoom is desired. For example, if a user 32 initially zooms by a certain amount, perhaps an amount limited by the extent of their fingers in a touch zoom event, it is a fair assumption that they may continue to zoom, perhaps by one or more additional interactions, up to a maximum level. This maximum level may be limited by limits imposed by the display application or display device, and in general for webpage browsers is typically limited to 500% zooming. Regardless, such an additional assumption can therefore circumvent an otherwise need for any intermediate image resolutions less than that appropriate for the maximum user zoom, thereby utilizing additional bandwidth only for the corresponding single, relatively-higher-resolution configurable picture image 16, thereby further accelerating the associated display thereof, and therefore improving the experience of the user 32.

Furthermore, in accordance with another set of embodiments, the interpretation of an act of zooming on, or proximate to, a specific image or images can be limited to interpretation as a request for improved resolution for those images if such an act is significant and deliberate enough so as to likely admit to no other interpretation. For example, interactions resulting in small zoom events might otherwise be interpreted as accidental because it is unlikely that a user 32 would indicate a desire for significantly higher resolution in an image that the user 32 is only zooming or expanding by a small amount. For example, unnecessary downloads might be avoided by establishing a condition for downloading additional image data to provide for additional resolution, for example, the detection of a significant degree of zooming, for example, greater than 20%, thereby avoiding an unnecessary need for, or use of, bandwidth.

It should be understood that both the first and second-aspect display processes 300, 700 can be operated jointly, i.e. that zooming or panning of the composite image 14 is not mutually exclusive of that of the configurable picture image 16, but instead, both can be accommodated together responsive at the command of the user 32.

Referring again to FIGS. 3 and 7, in accordance with a third aspect of the image processing system 10, 10.1, 10.2 and the associated display processes 300, 700, and with reference to step (314), the associated initially-displayed-portion 16.1 of the configurable picture image 16, 16.1 may include information in the computer code—for example in the image tags, the metadata of the images, or even in a previously generated and consolidated listing of such information, —that is transmitted from the server device 20 and received by the client display device 30 that indicates which of the initial images in the formatted arrangement of information can be increased in resolution in view of the presence of additional files on the server device 20 so that, upon zooming, the above-described associated processes of steps (704) or (318) can be skipped for any initially-displayed-portion 16.1 of the configurable picture images 16, 16.1 for which additional image information is not available, or for which there is an explicit instruction to do so.

In accordance with one set of embodiments, the display process 300, 700 may simply assume that every initial image can be improved by downloading additional files for such improvement based on a pre-established filename format derived from one or more identifying characteristics of the initial image file, wherein the indication of whether or not higher resolution image data is available might be inferred by use of an associated file-naming convention. For example, if the initial relatively-lower resolution image file name is "nameofimage.jpg" then a different file name might be used when storing a higher or highest resolution representation of that image as, for example, "nameofimage_max.jpg" or similar additional filenames as needed for associated higher-resolution versions of the image. Upon a zoom event and a subsequent request from the display application process to the server device 20 for these additional downloadable files, the display application process can simply modify the name of each initial image file to include the "_max" suffix, or other such predetermined modifications based on the initial image file name and or characteristics, as the file(s) to be downloaded. Although without any additional information prior to such a request, there would be no guarantee that such a file exists on the server device 20 because not all initial images may have additional accessible resolution, if the file does exist it can be applied to improve the associated initial image, whereas if it does not, the server device 20 can simply report an error and the display application can gracefully treat such an error as an indication that the associated initial image cannot be increased in resolution. Many permutations of filenames, and even other characteristics of the initial image, may be used for this purpose as long as the display application has the predetermined programming to format file requests to match the format of the additional files on the server device 20 as necessary for improving the respective image.

As an example of determining the presence of a higher resolution version of an initial image in the absence of other information such as a separate listing of improvable images, or metadata within the initial image suggesting the same, the file name of an initial lower resolution image can exhibit known similarities to the file name of the respective higher resolution image file name so that appropriate parsing of the file name of the initial lower resolution image file can automatically provide the root of the file name of an associated higher resolution image file. That higher resolution filename can then be used by the client device to request the higher resolution image file from the server device for replacement of the initial image. If an error is reported by the server device regarding the unavailability of such an image file, the initial image would simply not be replaced with a higher resolution image. For example, a high resolution image file name may be represented as "imagefilename.jpg" whereas any number of lower resolution representations of that high resolution image may have a file name represented as "imagefilename-300×200.jpg" wherein the "-300×200" may represent a lower resolution designation of the image. In accordance with this aspect, the lower resolution filename would be parsed to detect the "-" character and to then extract, as the filename of the higher-resolution image file, the string of characters in advance thereof.

Figure 11:
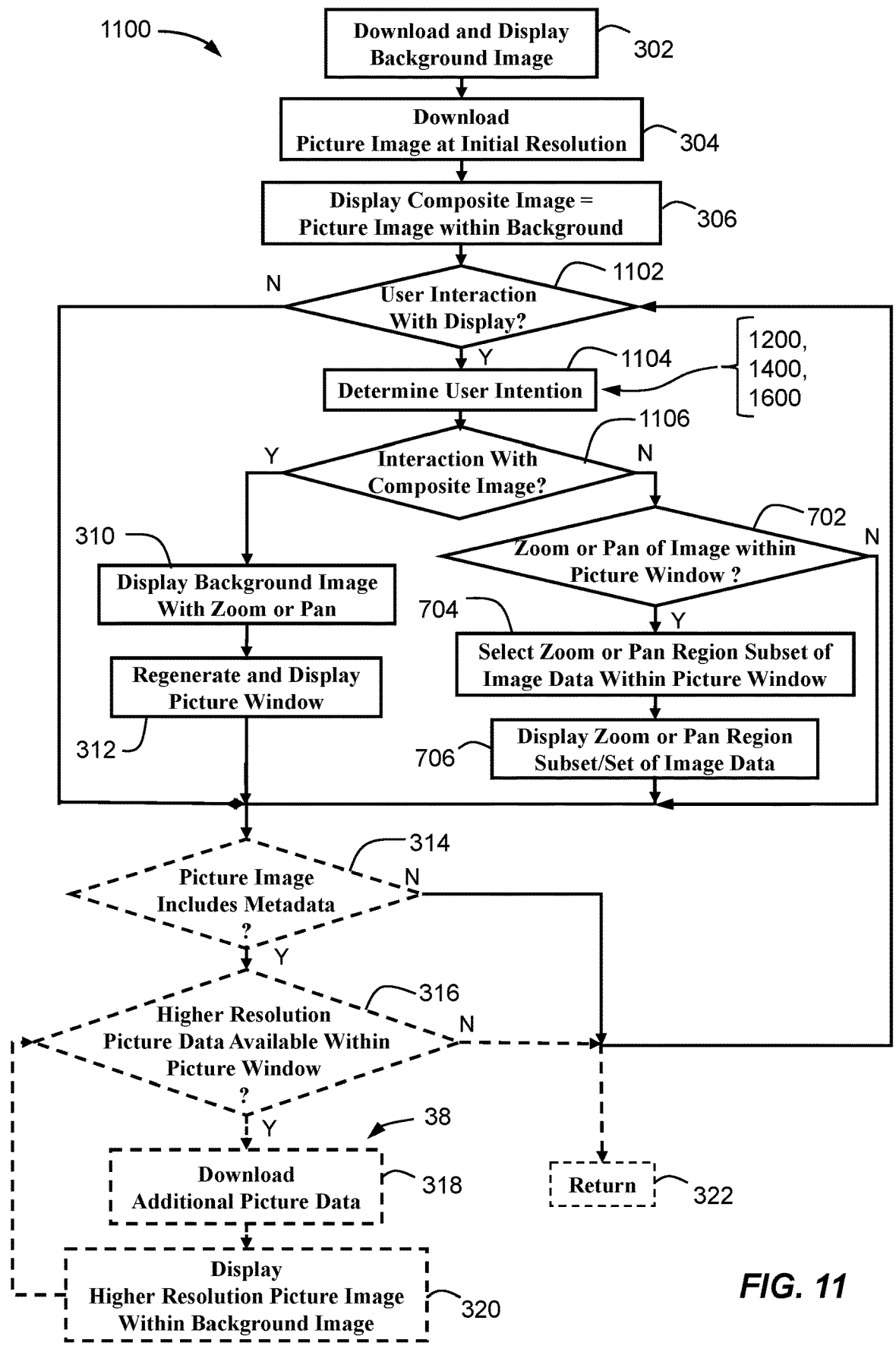
FIG. 11 illustrates a fourth aspect of a display process that provides for determining whether a user who is manipulating an image display is intending to manipulate the composite image as a whole, or to manipulate the picture image that is displayed therewithin.
Figure 12:
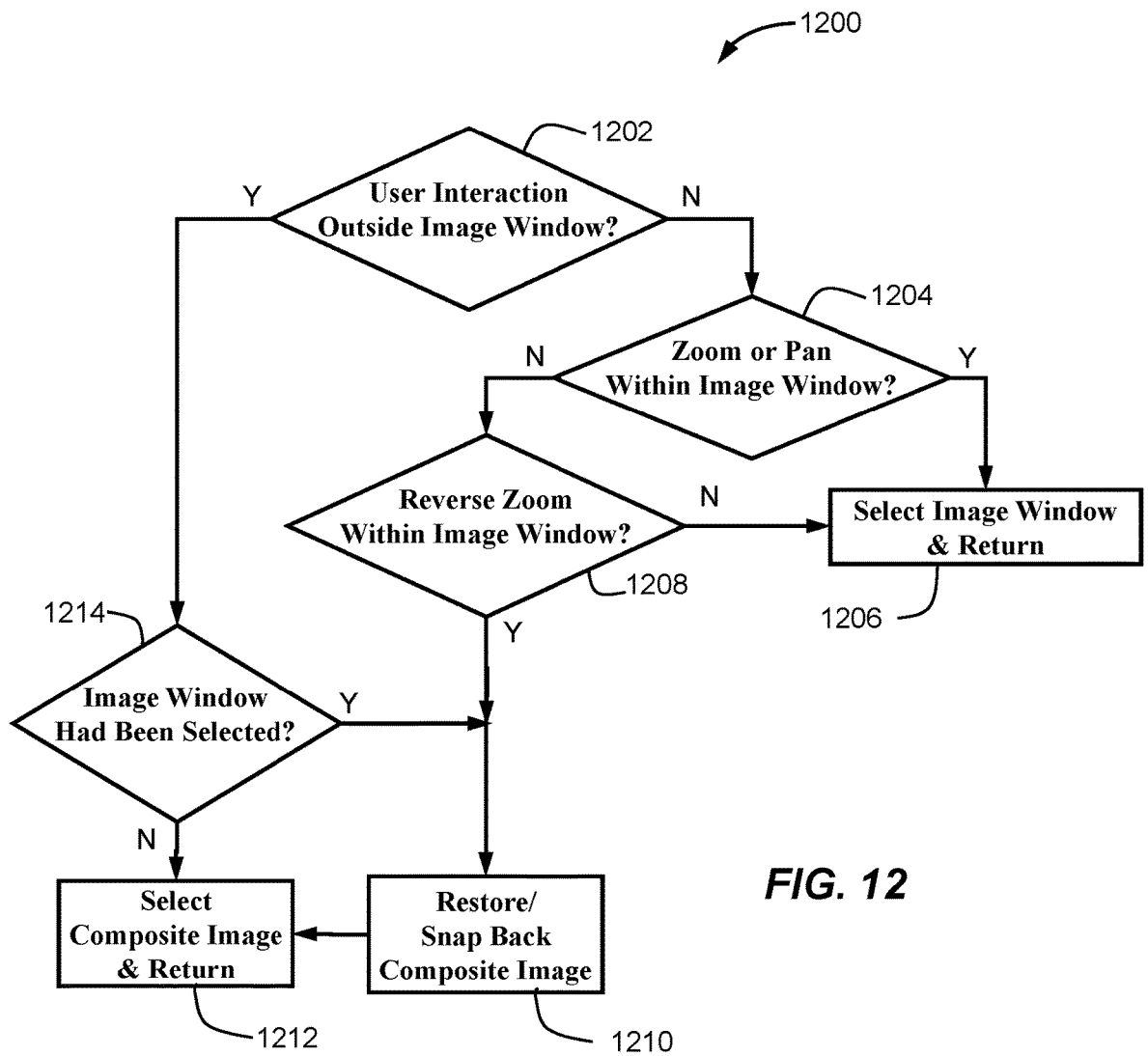
FIG. 12 illustrates a flow chart of a first embodiment of an intention-determination process.

Referring to FIG. 11, in accordance with a fourth aspect of a display process 1100 of the of the image processing system 10, 10.1, 10.2, an arrangement of formatted information such as, for example, a website webpage, is presented as a composite image 14 by a display application such as, for example, a web browser on a client display device 30, wherein the composite image 14 includes one or more picture images 16', 16 within an associated background image 18, and the display application also provides a means for expanding the entirety of the displayed arrangement of the composite image 14 to provide for increased resolution per unit area of the associated visually displayed content thereof, for example, by "zooming",—including, for example, pinch-to-zoom touch gestures, mouse and pointing device events, rotation of the device to change the device display format, clicking on related webpage or browser buttons or otherwise directly modifying the display application zoom level,—wherein the display application provides for a first level of zoom interaction for the entirety of displayed information and a second level of zoom interaction for a specific image window indicated by the interest of the user—i.e. the one or more picture images 16', 16, —and the associated first and second zoom level operations smoothly transitions from one level to the next and back according to that indicated interest so that the benefits of both zoom level operations are realized.

The fourth-aspect display process 1100 commences with downloading and displaying the background image 18 and an initial-resolution picture image 16', 16 in steps (302) through (306), the same as for the above-described first 300 and second 700 aspect display processes. Then, in step (1102), if an interaction of the user 32 with the image display 12 is detected, then, in an intention-determination step (1104), the intention of the user 32 is determined responsive to the nature of that interaction, as described more fully hereinbelow.

For example, in one set of embodiments, the image processing system 10, 10.1, 10.2 provides for the user 32 to interact with the image display 12 via either a mouse, touchpad, digital pen, or a touch-screen-enabled image display 12. The mouse is used to control a cursor on the image display 12 and can be used to select an image at the cursor position by pressing an associated mouse selection key, and to pan the selected image by translating the mouse in a direction corresponding to the pan direction while maintaining the selection, or rotating a mouse wheel or ball in the direction corresponding to the pan direction. The mouse can be used to either zoom into (higher magnification), or zoom out of (lower magnification), an image associated with the cursor by rotating the associated mouse wheel while pressing the CTRL key on an associated keyboard. A user 32 can use their fingers directly with a touchpad or touch-screen-enabled image display 12, or to manipulate a digital pen, to identify an image or location on the image display 12 of interest, and to select and pan that image across the image display 12, and user a pair of fingers to effect the zoom or rotation of an image, for example, using what is known as "pinch zoom".

Accordingly, in step (1102), the display process 1100 determines if the user 32 is interacting with the image display 12, and if so, the nature of that interaction, for example, the portion of the image display 12 and whether there is an associated zoom or pan action by the user 32 thereat. If, from step (1102), the user 32 is not interacting with the image display 12, then either step (1102) is repeated until an interaction is detected, or alternatively, the above-described steps (316) through (320)—optionally in cooperation with step (314)—may be used to improve the resolution of a configurable picture image 16 if additional image content is available in step (316). Alternatively, from either step (1102) directly, or at the completion of optional steps (314) through (320), the display process 1100 may return control in step (322).

Following the intention-determination step (1104), in step (1106), if the intention-determination step (1104) determines that the user 32 is intending to act on the background image 18, or equivalently, to act on the composite image 14 as a whole, then, as described hereinabove in the context of the first-aspect display process 300, in step (310) the background image 18 is panned or zoomed responsive to the command from the user 32—for example, via either touch, mouse, or other pointing device—and in step (312) the picture image 16', 16 is regenerated within the associated picture region/image window 17 of the composite image 14.

Otherwise, from step (1106), if the intention-determination step (1104) determines that the user 32 is intending to act on the picture image 16', 16, then, as described hereinabove in the context of the second-aspect display process 700, in step (702), if user 32 has initiated a zooming or panning of the composite image 14, then, in step (704), either using the picture image 16', 16 as downloaded in step (304), or by the client display device 30 making a request for image data for the associated zoom or pan region within the source image 36, and then downloading that data from the server device 20, in step (706), the associated picture image 16', 16, or portion thereof, is displayed on the image display 12 of the client display device 30. Following either step (312) or step (706), the first-aspect display process 300 continues as described hereinabove from step (1102) if the user 32 is not interacting with the image display 12.

Returning to the intention-determination step (1104), and referring to FIGS. 12 and 13a through 13j, a first embodiment of an associated intention-determination process 1200 called from step (1104), provides for, inter alia, monitoring the location of the cursor location responsive to the mouse, touchpad, touchscreen, digital pen, or other pointing device at the time of selecting, zooming or panning within the composite image 14, and identifying which image 16, 16', 18—i.e. the picture image 16', 16 or the background image 18—the user 32 is intending to manipulate responsive to that location, wherein the intended image is interpreted to be the image associated with that location. Furthermore, the first-embodiment intention-determination process 1200 provides for recognizing a user's interest in exiting a user-selected zooming or panning of a the picture image 16', 16 and returning to the zooming or panning of the composite image 14 as a whole, for example, responsive to the user interacting with a feature of the picture image 16', 16; a feature of the background image 18; or a feature of the display device itself, which may include the detection of the user 32 applying some level of the reverse operation of zooming, i.e. zooming out, of the picture image 16', 16 to indicate a desire to return zooming control to the entirety of the composite image 14.

For example, in one set of embodiments, if the user 32 appears to be intending to manipulate the picture image 16', 16, the picture image 16', 16 is selected for manipulation. Otherwise, the composite image 14 is selected for manipulation, and if either there had been a reverse zoom within the picture image 16', 16, or for the first instance following a previous selection/manipulation of the picture image 16', 16, the composite image 14 is first restored to its original scaling prior to subsequent manipulation. More particularly, referring to FIG. 12, following commencement of the first-embodiment intention-determination process 1200 from the intention-determination step (1104) of the display process 1100, if, in step (1202), the interaction of the user 32 with the image display 12 is within the picture region/image window 17 of the composite image 14, and if, in step (1204), the user 32 is attempting a zoom or pan within the picture region/image window 17, then, in step (1206), the picture region/image window 17 is selected for subsequent manipulation by the display process 1100. Otherwise, from step (1204), if, in step (1208), the user 32 is attempting to reverse zoom—i.e. zoom out—the picture image 16', 16 within the picture region/image window 17, then, in step (1210), the composite image 14 is restored to its original scaling, with the background image 18 snapped back to fill the image display 12, and with the picture image 16', 16 snapped back to fill the picture region/image window 17 within the background image 18, after which, in step (1212), the composite image 14 is selected for subsequent manipulation by the display process 1100. Otherwise, from step (1202), if the interaction of the user 32 with the image display 12 is outside the picture region/image window 17 of the composite image 14, and if, in step (1214), the picture region/image window 17 had been the most-recently selected portion of the composite image 14 for manipulation, then the first-embodiment intention-determination process 1200 proceeds with the above-described step (1210). Otherwise, from step (1214), in step (1212), the composite image 14 is selected for subsequent manipulation by the display process 1100.

Figure 13A:
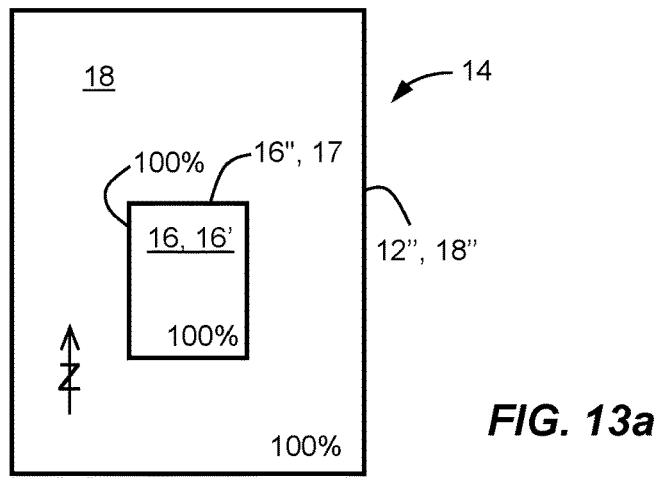
FIG. 13a illustrates a schematic illustration of an original composite image prior to manipulation by a display process in cooperation with a first set of examples of the first-embodiment intention-determination process.
Figure 13B:
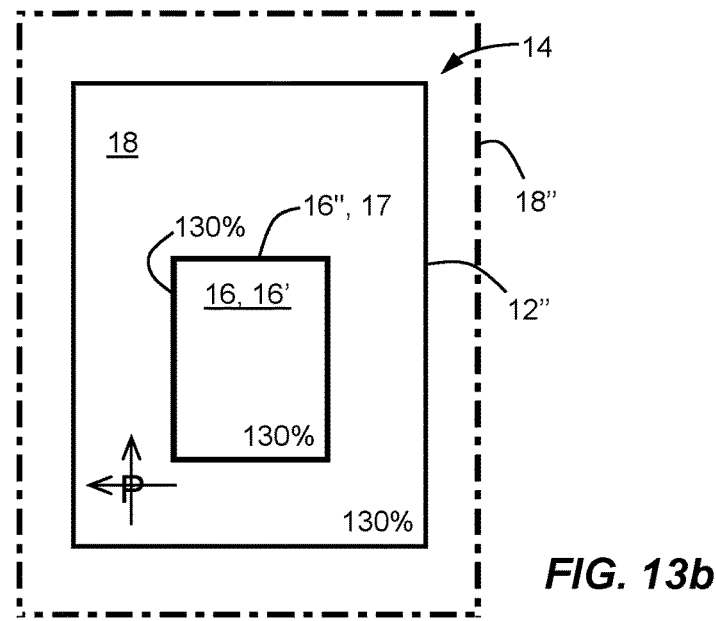
FIG. 13b illustrates a schematic illustration of a zoomed version of the composite image illustrated in FIG. 13a, zoomed from within the background image portion thereof.

FIGS. 13*a* though 13*j* illustrate various aspects of the operation of the first-embodiment intention-determination process 1200. For example, beginning with FIG. 13*a*, —which illustrates a composite image 14 on an image display 12 following step (306) of the fourth-aspect display process 1100, —responsive to a zoom command actuated by the user 32 within the background image 18 portion of the composite image 14 (indicated in the FIGS. by a "Z" upon which is superimposed an up-arrow), from step (1212) following step (1202), the composite image 14 is selected and zoomed in step (310) of the fourth-aspect display process 1100, which inherently results in a corresponding expansion of the associated picture region/image window 17, after which, in step (312), the picture image 16', 16 is expanded to fill the expanded picture region/image window 17, so as to result in the composite image 14 illustrated in FIG. 13*b*, for which the virtual edge 18" of the associated background image 18 extends beyond the edge 12" of the image display 12. For example, FIG. 13*b* illustrates an expansion by 130% of each of the background image 18, the associated picture region/image window 17, and the picture image 16', 16 displayed therewithin. The zoomed composite image 14 illustrated in FIG. 13*b* is then panned responsive to a pan command actuated by the user 32 within the background image 18 portion of the composite image 14 (indicated in the FIGS. by a "P" upon which is superimposed an vertical and horizonal arrows), resulting in the panned and zoomed composite image 14 illustrated in FIG. 13*c*.

Figure 13C:
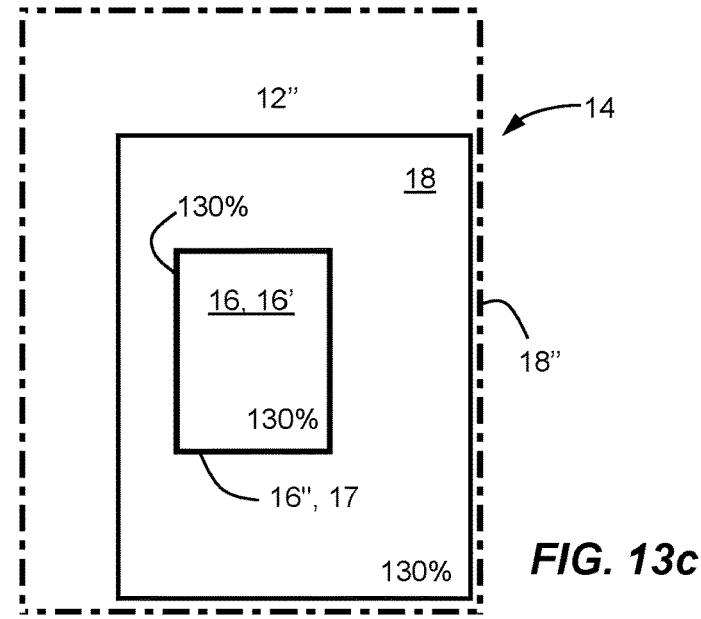
FIG. 13c illustrates a schematic illustration of a panned version of the zoomed composite image illustrated in FIG. 13b, panned from within the background image portion thereof.
Figure 13D:
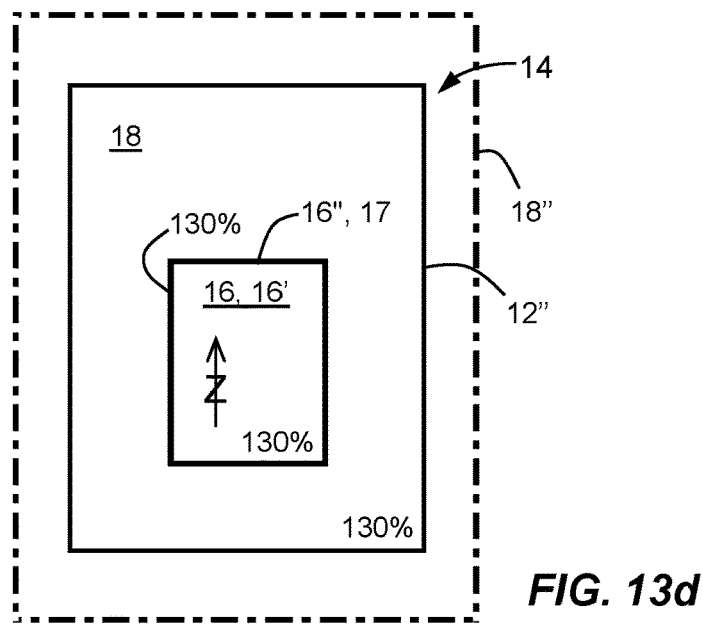
FIG. 13d illustrates a schematic illustration of a zoomed version of the composite image illustrated in FIG. 13a prior to zooming from within the associated picture image portion.
Figure 13E:
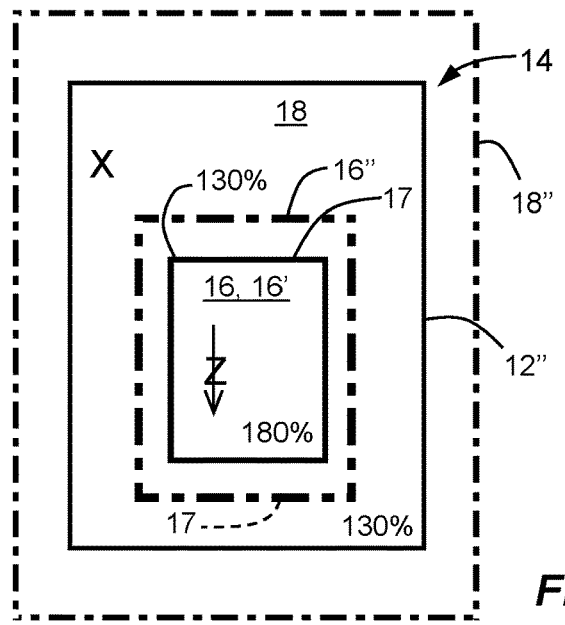
FIG. 13e illustrates a schematic illustration of a composite image resulting from zooming within the picture image portion of the composite image illustrated in FIG. 13d.

Alternatively, beginning with the zoomed composite image 14 from FIG. 13*b*, which is repeated in FIG. 13*d*, responsive to a zoom command actuated by the user 32 within the picture image 16', 16 portion of the composite image 14, from step (1206) following step (1204), the picture image 16', 16 is selected and zoomed in step (704) of the fourth-aspect display process 1100, which, in one set of embodiments, inherently causes the picture image 16', 16 to be cropped by the picture region/image window 17 of the composite image 14, so that the virtual edge 16" of the picture image 16', 16 extends beyond the picture region/image window 17 of the composite image 14 when redrawing the picture image 16', 16 in step (706) of the fourth-aspect display process 1100, resulting in the zoomed composite image 14 with a subsequently zoomed picture image 16', 16 as illustrated in FIG. 13*e*. For example, FIG. 13*e* illustrates an expansion by 180% of the picture image 16', 16 relative to the original size thereof. Alternatively, in another set of embodiments, the picture region/image window 17 could be configured to conform to the expanded picture image 16', 16, so that what had been the virtual edge 16" of the picture image 16', 16 corresponds to an expanded edge of the picture region/image window 17.

Figure 13F:
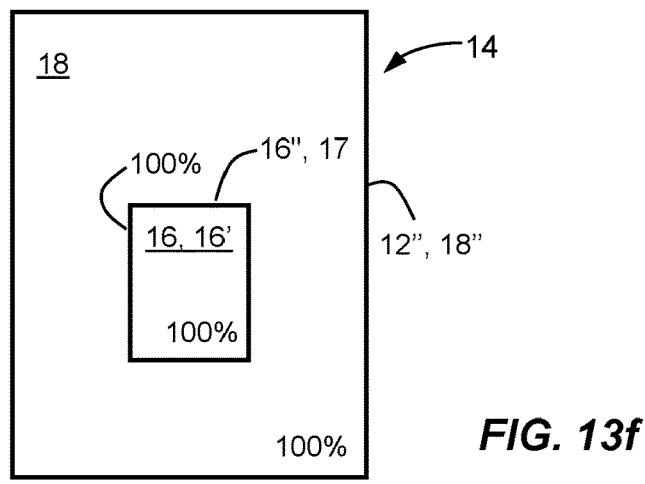
FIG. 13f illustrates a schematic illustration of the original composite image that results from a reverse zoom from within the associated picture image of the composite image illustrated in FIG. 13e.

Responsive to a reverse zoom command actuated by the user 32 within the picture region/image window 17 of the composite image 14 (indicated in the FIGS. by a "Z" upon which is superimposed a down-arrow), or from selection by the user 32 anywhere outside the picture region/image window 17 of the composite image 14 (indicated in the FIGS. by an "X"), in step (1210), the original composite image 14 is restored, and snapped back to within the edge 12" of the image display 12, as illustrated in FIG. 13*f*, responsive to either steps (1208) or (1214), respectively, of the first-embodiment intention-determination process 1200.

Figure 13G:
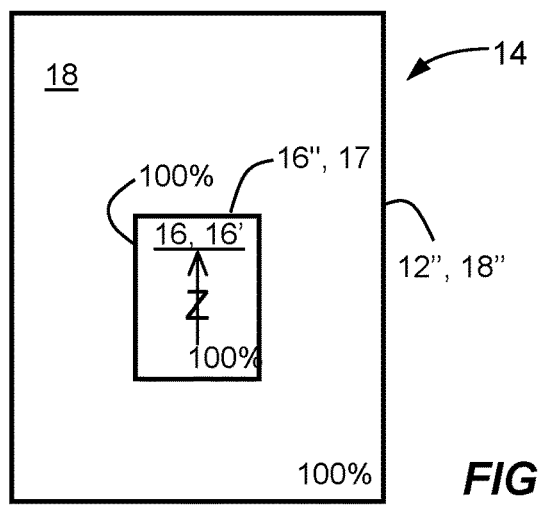
FIG. 13g illustrates a schematic illustration of an original composite image prior to manipulation by a display process in cooperation with a second set of examples of the first-embodiment intention-determination process.
Figure 13H:
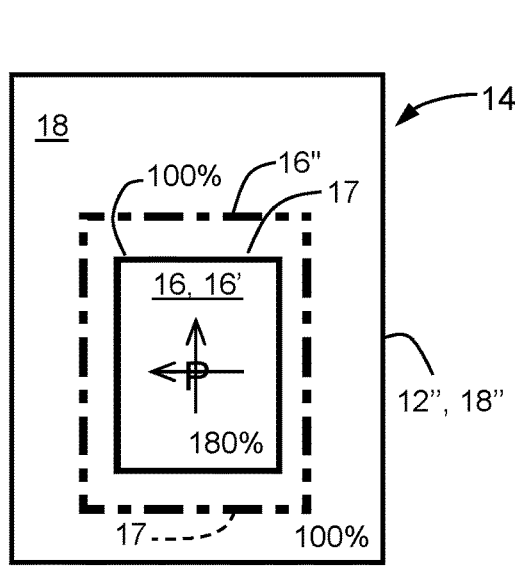
FIG. 13h illustrates a schematic illustration of a zoomed version of the composite image illustrated in FIG. 13a following zooming from within the associated picture image thereof.

As another example, beginning with FIG. 13*g*, —which illustrates a composite image 14 on an image display 12 following step (306) of the fourth-aspect display process 1100, —responsive to a zoom command actuated by the user 32 within the picture image 16', 16 of the composite image 14, from step (1206) following step (1204), the picture image 16', 16 is selected and zoomed in step (704) of the fourth-aspect display process 1100, which, in one set of embodiments, inherently causes the picture image 16', 16 to be cropped by the picture region/image window 17 of the composite image 14, so that the virtual edge 16" of the picture image 16', 16 extend beyond the picture region/image window 17 of the composite image 14 when redrawing the picture image 16', 16 in step (706) of the fourth-aspect display process 1100, resulting in the zoomed composite image 14 with a subsequently zoomed picture image 16', 16 as illustrated in FIG. 13*h*. For example, FIG. 13*h* illustrates an expansion by 180% of the picture image 16', 16 relative to the original size thereof. Alternatively, in another set of embodiments, the picture region/image window 17 could be configured to conform to the expanded picture image 16', 16, so that what had been the virtual edge 16" of the picture image 16', 16 corresponds to an expanded edge of the picture region/image window 17.

Figure 13I:
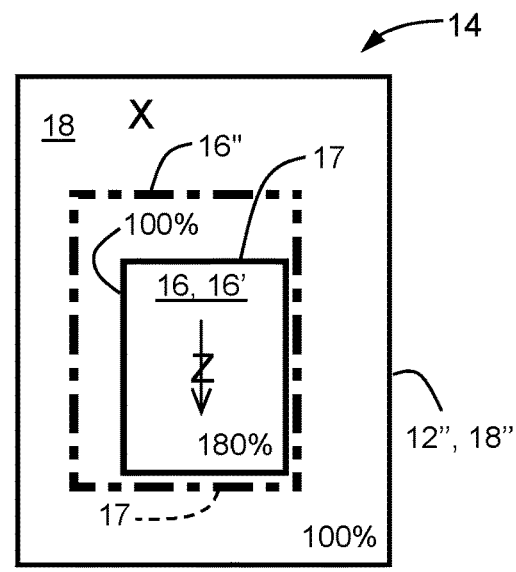
FIG. 13i illustrates a schematic illustration of the composite image illustrated in FIG. 13h following panning from within the associated picture image thereof.

FIG. 13*i* illustrates a subsequent panning of the picture image 16', 16 from FIG. 13*h*, similar to that described hereinabove for the generation of the panned-zoomed composite image 14 illustrated in FIG. 13c, but instead applied only to the picture image 16', 16, the latter of which is panned relative to the associated background image 18.

Figure 13J:
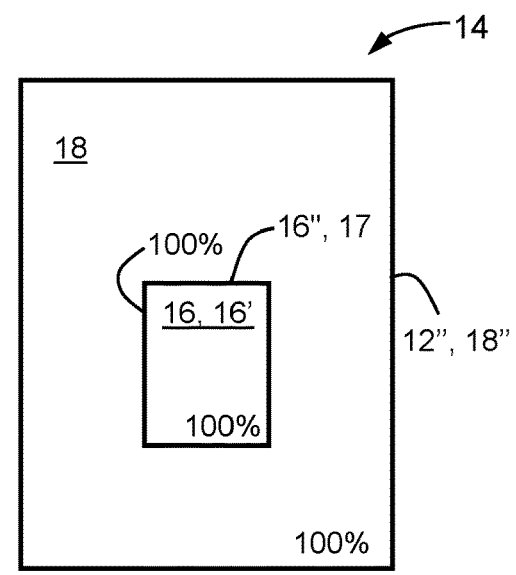

Finally, FIG. 13j illustrates a restoration of the original composite image 14 responsive to either a reverse zoom from within the picture image 16', 16, or responsive to a selection by the user 32 anywhere outside the picture region/image window 17 of the composite image 14, as described hereinabove in respect of the generation of the composite image 14 illustrated in FIG. 13f from that illustrated in FIG. 13e.

Notwithstanding that in many situations the above-described first-embodiment intention-determination process 1200 provides for improving the zooming experience of the user 32, in some situations, the first embodiment intention-determination process 1200 may be susceptible to erroneously determining the intention of the user 32. For example, a user 32 who inadvertently touches the picture image 16', 16 during typical zooming of the entirety of the composite image 14 without intending to engage user-selected zooming of the touched picture image 16', 16 may find it inconvenient for the picture image 16', 16 to be selected for zooming. Furthermore, a user 32 zooming out of a picture image 16', 16 through user-selected reverse zooming may only wish to see more of the extent of that picture image 16', 16 without intending to end that functionality and restore the original composite image 14.

Referring to FIGS. 14 and 15a through 15i, a second embodiment of an associated intention-determination process 1400 provides for more naturally interpreting the intention of the user 32, so as to mitigate against the above-described limitations. More particularly, in accordance with the second embodiment of the intention-determination process 1400, called from step (1104) of the fourth-aspect display process 1100, responsive to a perceived intent of the user 32 to zoom in on the picture image 16', 16, the zooming operation is first applied to the entire composite image 14 until a threshold level of zooming has been achieved, after which zooming is applied to the picture image 16', 16 alone provided that the perceived intent for such zooming persists. Furthermore, if the zooming functions of the composite image 14 are limited to a maximum zoom level, for example by a limitation imposed by a web browser, then achieving that maximum zoom level with an interpreted interest of the user 32 in the picture image 16', 16 is a far more clear indication that the user desires an even higher level of zooming of that picture image 16', 16 so as to then trigger user-selected zooming thereof.

Similarly, when reverse zooming the picture image 16', 16, the picture image 16', 16 alone is reverse zoomed (i.e. zoomed out) until filling the associated picture region/image window 17 of the composite image 14, after which the entire composite image 14 is reverse zoomed. These conditions are associated with a far higher likelihood that the user 32 intends for increased zooming on the picture image 16', 16. User-selected zooming of the picture image 16', 16 can be disengaged based on a zooming-out threshold when the entire expanse of an image completely fills the picture region/image window 17 of the composite image 14, essentially returning that picture image 16', 16 to its appearance prior to the engagement of user-selected zooming, but at the size of the picture region/image window 17 which can be larger than that of the original composite image 14 because of the below-zoom-threshold zooming thereof This application of thresholds to zooming and reverse zooming provides a far more fluid experience for the user 32. Upon zooming in on the entirety of the composite image 14, once zooming reaches the zooming limit of the display application, —for example, that of the web browser, —if the user 32 is intending to zoom further on a particular picture image 16', 16, then the entire experience proceeds from a more macroscopic zooming of the entire composite image 14 and associated picture region/image window 17 followed by a smooth transition to continued additional zooming of the picture image 16', 16 alone within the associated picture region/image window 17 of the composite image 14. Similarly, a reverse zooming action within a particular picture image 16', 16 will smoothly transition from the user-selected zooming after the targeted picture image 16', 16 fills its respective picture region/image window 17 and will then smoothly continue to a more macroscopic zooming out of the entirety of composite image 14.

Figure 14:
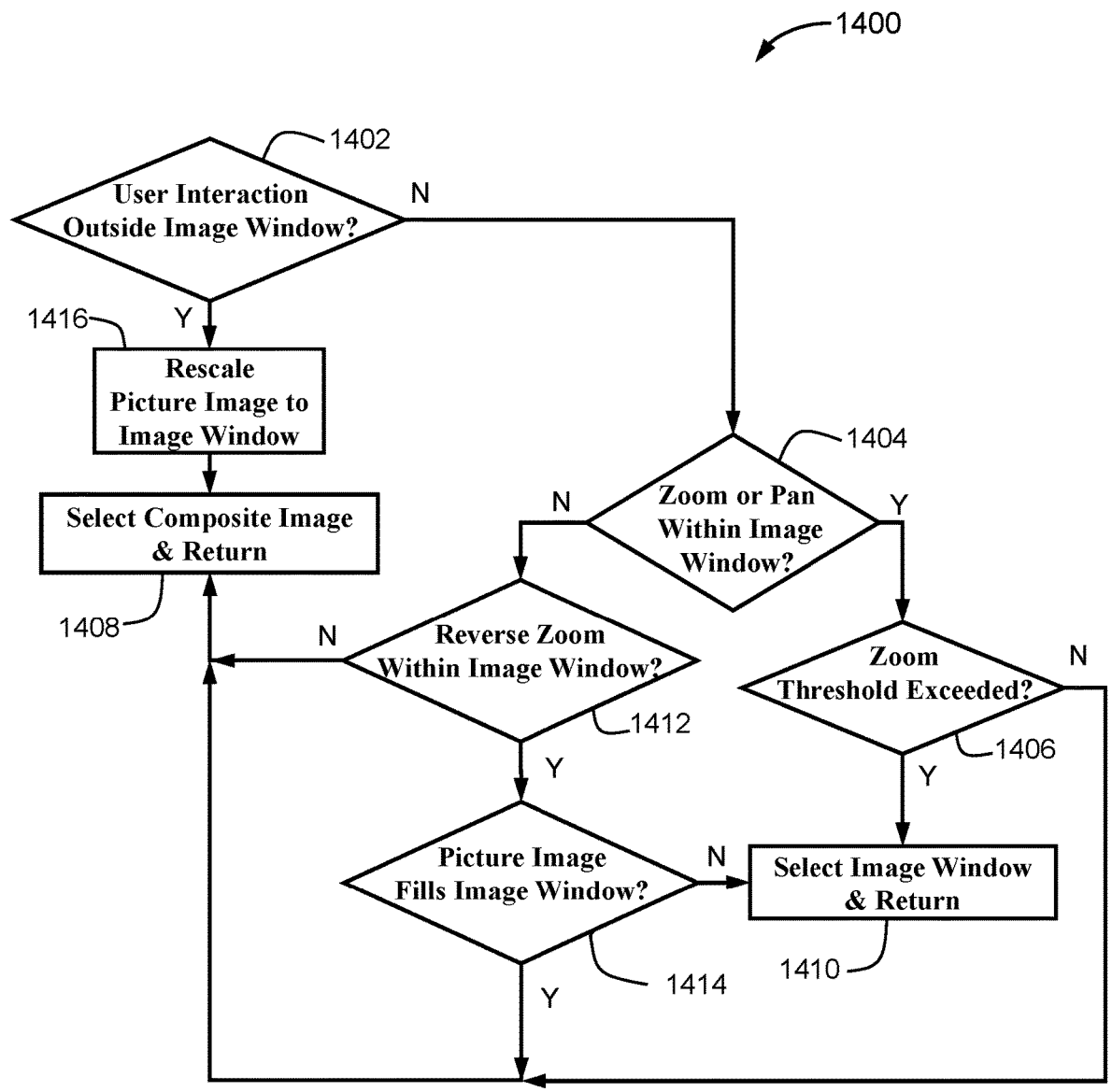
FIG. 14 illustrates a flow chart of a second embodiment of an intention-determination process.

More particularly, referring to FIG. 14, following commencement of the second-embodiment intention-determination process 1400 from the intention-determination step (1104) of the display process 1100, if, in step (1402), the interaction of the user 32 with the image display 12 is within the picture region/image window 17 of the composite image 14, and if, in step (1404), the user 32 is attempting a zoom or pan within the picture region/image window 17, and if, in step (1406), the level of zoom of the picture image 16', 16 does not exceed a threshold, then, in step (1408), the composite image 14 is selected for subsequent manipulation by the display process 1100, so as to provide for zooming in on the composite image 14 even though it is the picture image 16', 16 that has been selected. Otherwise, from step (1406), if the level of zoom of the picture image 16', 16 exceeds the threshold, then, in step (1410), the picture region/image window 17 is selected for subsequent manipulation by the display process 1100, so as to provide for the picture image 16', 16 to be zoomed exclusively. Otherwise, from step (1404), if the user 32 does not appear to be attempting a zoom or pan withing the picture region/image window 17, then, in step (1412), if the user 32 appears to be attempting a reverse zoom withing the picture region/image window 17, then, in step (1414), if the picture image 16', 16 does not fill the picture region/image window 17, then, in step (1410), the picture region/image window 17 is selected for subsequent manipulation by the display process 1100, so as to provide for the picture image 16', 16 exclusively to be zoomed out. Otherwise, from step (1414), if the picture image 16', 16 fills the associated picture region/image window 17, or, in one set of embodiments, otherwise from step (1412), then, in step (1408), the composite image 14 is selected for subsequent manipulation by the display process 1100, so as to provide for zooming out of the composite image 14 even though it is the picture image 16', 16 that has been selected. Otherwise, from step (1402), if the interaction of the user 32 with the image display 12 is outside the picture region/image window 17, then, in step (1416), if not already rescaled, the picture image 16', 16 is rescaled to fit the picture region/image window 17 of the composite image 14 Clean Version and, in step (1408), the composite image 14 is selected for subsequent manipulation by the display process 1100.

Figure 15A:
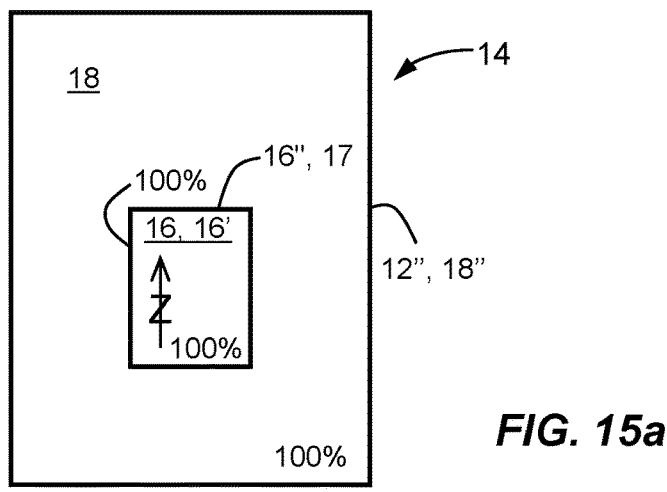
FIG. 15a illustrates a schematic illustration of an original composite image prior to manipulation by a display process in cooperation with a set of examples of the second-embodiment intention-determination process.
Figure 15B:
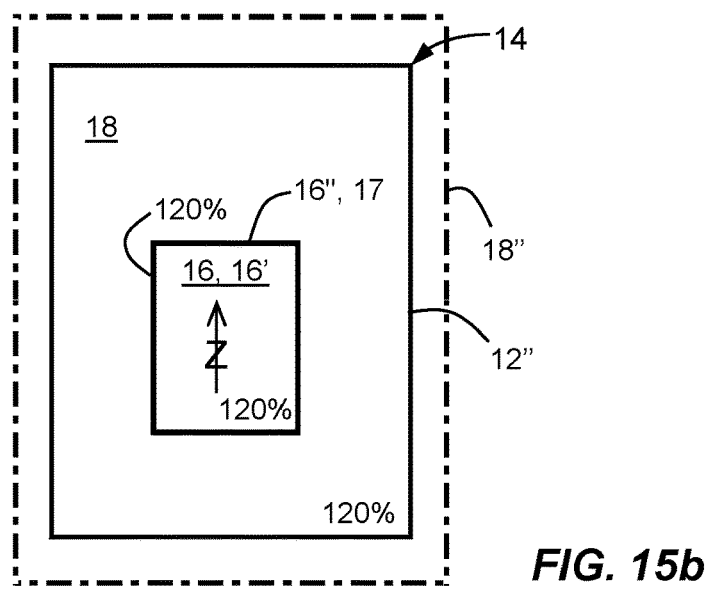
FIG. 15b illustrates a schematic illustration of a zoomed version of the composite image illustrated in FIG. 15a, zoomed from within the picture image portion thereof by an amount equal to an associated zoom threshold.
Figure 15C:
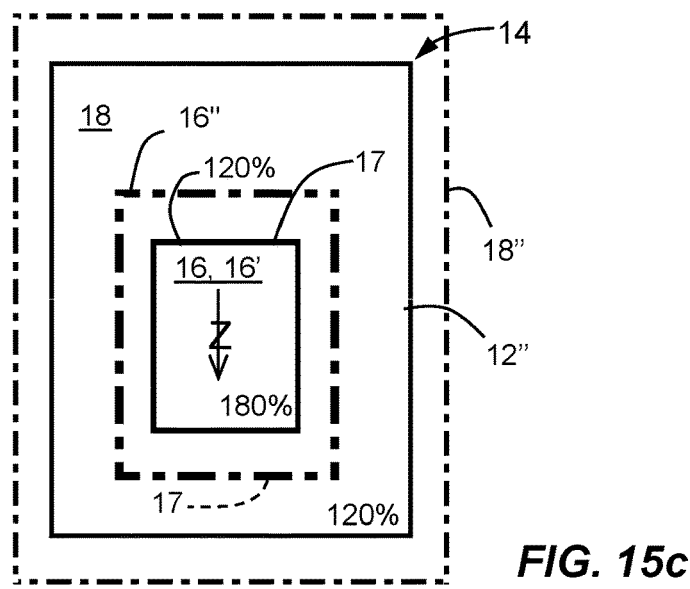
FIG. 15c illustrates a schematic illustration of a zoomed version of the composite image illustrated in either of FIG. 15a or 15b, zoomed from within the picture image portion thereof by an amount in excess of an associated zoom threshold.

FIGS. 15a though 15i illustrate various aspects of the operation of the second-embodiment intention-determination process 1400. For example, beginning with FIG. 15a, —which illustrates a composite image 14 on an image display 12 following step (306) of the fourth-aspect display process 1100, responsive to a zoom command actuated by the user 32 within the picture image 16', 16 portion of the composite image 14, from step (1406) following step (1404), if the level of zoom of the picture image 16', 16 is less than a threshold—for example, 120%—then, from step (1408) following step (1406), the composite image 14 is selected and zoomed in step (704) of the fourth-aspect display process 1100, which inherently results in a corresponding expansion of the associated picture region/image window 17, after which, in step (706), the picture image 16', 16 is expanded to fill the expanded picture region/image window 17, so as to result in the composite image 14 illustrated in FIG. 15*b*, for which the virtual edge 18" of the associated background image 18 extends beyond the edge 12" of the image display 12. Then, responsive to a zoom command actuated by the user 32 within the picture image 16', 16 portion of the composite image 14, from step (1406) following step (1404), the picture image 16', 16 is selected and zoomed in step (704) of the fourth-aspect display process 1100, which, in one set of embodiments, inherently causes the picture image 16', 16 to be cropped by the picture region/image window 17 of the composite image 14, so that the virtual edge 16" of the picture image 16', 16 extends beyond the picture region/image window 17 of the composite image 14 when redrawing the picture image 16', 16 in step (706) of the fourth-aspect display process 1100, resulting in the zoomed composite image 14 with a subsequently zoomed picture image 16', 16 as illustrated in FIG. 15*c*. For example, FIG. 15*c* illustrates an expansion by 180% of the picture image 16', 16 relative to the original size thereof. Alternatively, in another set of embodiments, the picture region/image window 17 could be configured to conform to the expanded picture image 16', 16, so that what had been the virtual edge 16" of the picture image 16', 16 corresponds to an expanded edge of the picture region/image window 17.

Figure 15D:
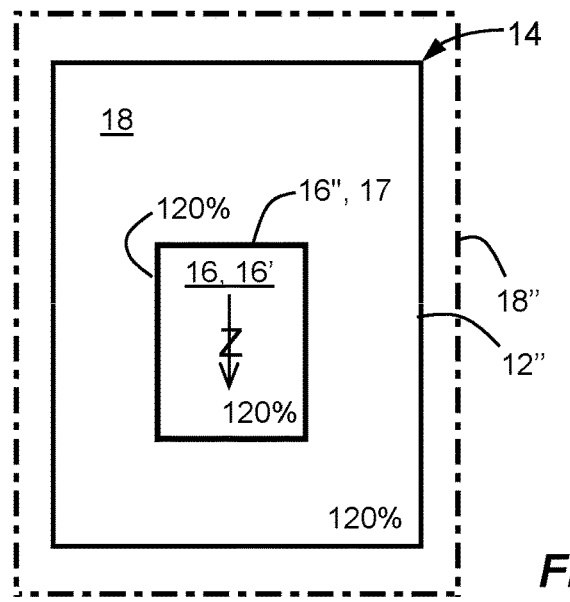
FIG. 15d illustrates a schematic illustration of the composite image illustrated in FIG. 15c following a reverse zoom from within the associated picture image thereof, with the picture image zoomed at the associated zoom threshold.
Figure 15E:
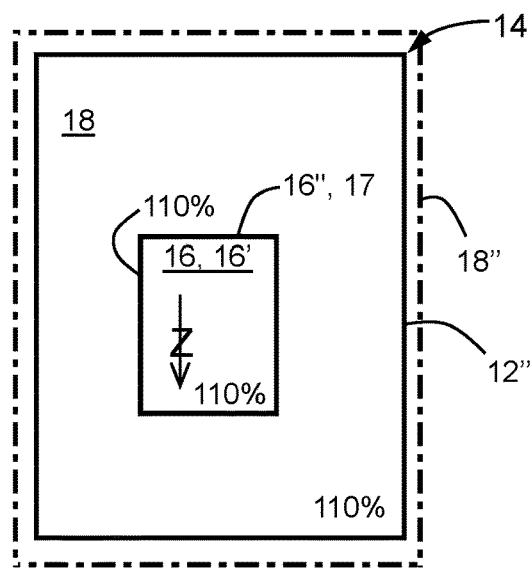
FIG. 15e illustrates a schematic illustration of the composite image illustrated in FIG. 15d following a reverse zoom from within the associated picture image thereof, with the picture image zoomed below the associated zoom threshold.
Figure 15F:
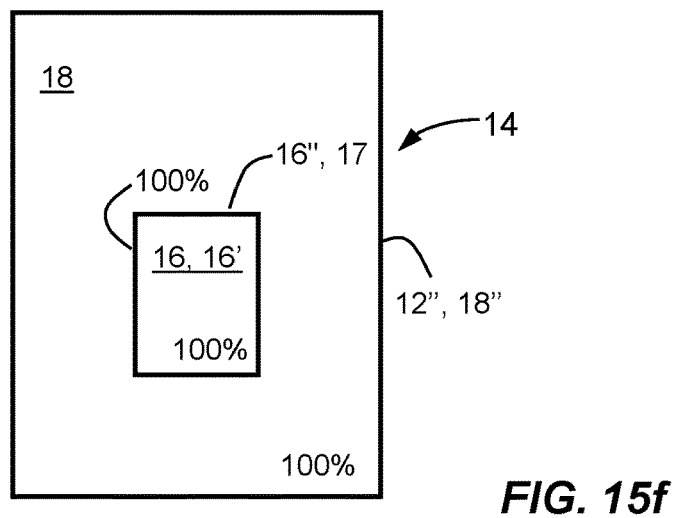

Starting with the configuration of FIG. 15*c*, a reverse zoom of the picture image 16', 16 from within the picture region/image window 17 initially results in zooming out of the picture image 16', 16 alone until—per step (1414)—the picture image 16', 16 fills the picture region/image window 17 of the composite image 14, the latter of which had been expanded in size by the zoom threshold relative to that of the original composite image 14, as illustrated in FIG. 15*d*. A following subsequent reverse zoom from within the picture region/image window 17 of the picture image 16', 16 then results in the selection of the composite image 14 following step (1414), resulting a reverse zooming of the composite image 14, which is illustrated in FIG. 15*e* with a zoom level of 110% relative to the original composite image 14—with the background image 18, the picture region/image window 17, and the associated picture image 16', 16 each expanded by 110% relative to their original sizes. Following a sufficient subsequent reverse zoom within the picture region/image window 17 of the picture image 16', 16, the composite image 14 is returned to its original size, as illustrated in FIG. 15*f*.

Figure 15G:
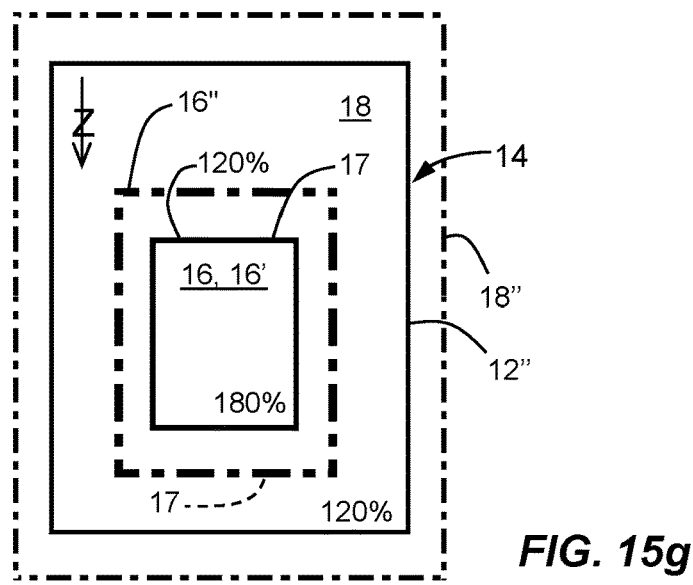
FIG. 15g illustrates a schematic illustration of the composite image illustrated in FIG. 15d prior to a reverse zoom therefrom from within the associated background image thereof.
Figure 15H:
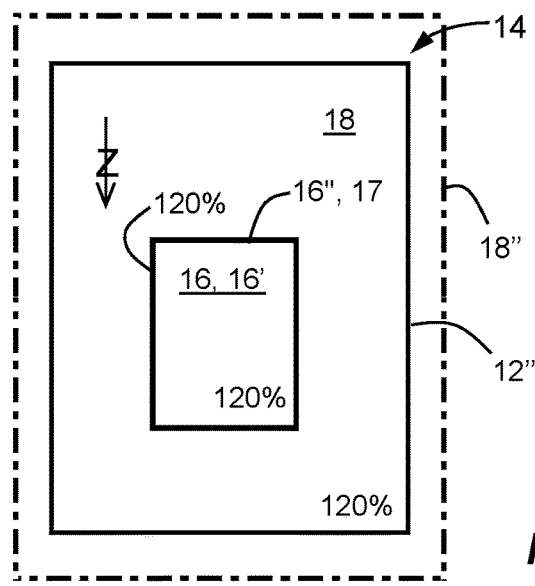
FIG. 15h illustrates a schematic illustration of the composite image illustrated in FIG. 15g following a reverse zoom from within the associated background image thereof, prior to a further reverse zoom of the composite image.
Figure 15I:
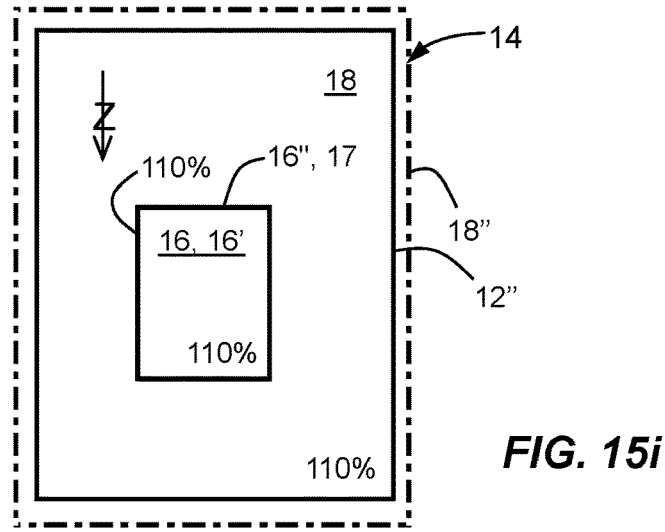
FIG. 15i illustrates a schematic illustration of the composite image illustrated in FIG. 15h following a reverse zoom of the composite image from within the associated background image thereof.

Alternatively, starting with the configuration of FIG. 15*c*, the composite image 14 of which is repeated in FIG. 15*g*, a reverse zoom from within the background image 18—i.e. outside of the picture region/image window 17—per step (1416), initially results in the picture image 16', 16 being rescaled to the picture region/image window 17 of the composite image 14, for example, as illustrated in FIG. 15*h*, the latter of which illustrates the same composite image 14 as had been illustrated in FIG. 15*d*. Thereafter, with the level of zoom of the picture image 16', 16 being less than or equal to that of the associated zoom threshold, subsequent reverse zooming from within the background image 18 is the same as that described hereinabove from within the picture image 16', 16. For example, a reverse zoom from within the background image 18 of FIG. 15*h* has the same effect as had been illustrated in the transition from FIG. 15*d* to FIG. 15*e*, so that the composite image 14 illustrated in FIG. 15*i* resulting from a reverse zoom from within the background image 18 of FIG. 15*h* is the same as that illustrated in FIG. 15*e*. A subsequent sufficient reverse zoom from within the background image 18 of FIG. 15*i* then results in the original composite image 14 as has been illustrated in FIG. 15*f*.

In some situations, it can sometimes be difficult with the second-embodiment intention-determination process 1400 to universally detect the actual zoom level of a multitude of display applications, for example web browsers, over a broad combination of different display devices, which can make reaching a threshold of a browser zoom level difficult to consistently apply as an event for transitioning from the more macroscopic zooming of the composite image 14 to the user-selected zooming of the picture image 16', 16. Furthermore, if user-selected zooming can only be engaged on the picture image 16', 16 after a maximum level of zooming of the composite image 14 is achieved, this restricts the ability of the user 32 to control the visibility of the information around the picture image 16', 16. As an extreme example, a user 32 may actually prefer to see the entirety of the background image 18 with no macroscopic zooming at all while engaging user-selected zooming on the picture image 16', 16, regardless of the size of the picture region/image window 17, without impacting the background image 18.

Referring to FIGS. 16 and 17*a* through 17*i*, a third embodiment of an associated intention-determination process 1600 provides for addressing these situations by offering independence between the more macroscopic zooming of the composite image 14 and the user-selected zooming of the picture image 16', 16 while still providing a simple and intuitive transition between the two. Specifically, the typical pan and zooming interactions between the user and the composite image 14 are preserved in all cases except for the following two. First, if a zoom or pan event is initiated with either a mouse pointer or the initial touch of at least two fingers inside the picture region/image window 17 of a picture image 16', 16, then user-selected zooming (and optionally panning as well) is engaged for that event, thereby modifying only the picture image 16', 16. Second, if user-selected reverse zooming of the picture image 16', 16 results in zooming out such that the entire expanse of the picture image 16', 16 fills the corresponding picture region/image window 17, then user-selected zooming is disengaged in favor of reverse zooming of the composite image 14.

Figure 16:
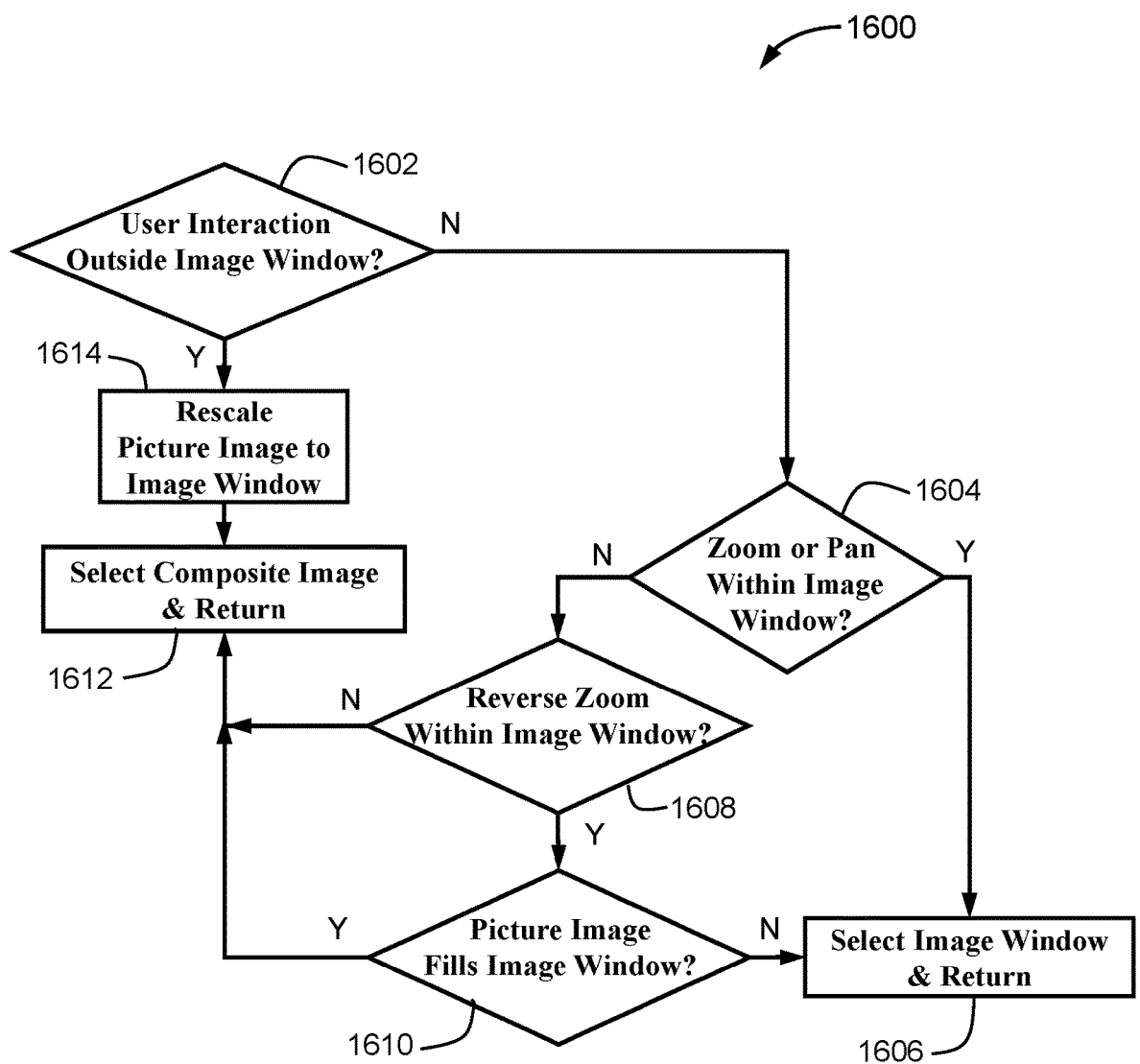
FIG. 16 illustrates a flow chart of a third embodiment of an intention-determination process.

More particularly, referring to FIG. 16, following commencement of the third-embodiment intention-determination process 1600 from the intention-determination step (1104) of the display process 1100, if, in step (1602), the interaction of the user 32 with the image display 12 is within the picture region/image window 17 of the composite image 14, and if, in step (1604), the user 32 is attempting a zoom or pan within the picture region/image window 17, then, in step (1606), the picture region/image window 17 is selected for subsequent manipulation by the display process 1100. Otherwise, from step (1604), if, in step (1608), the user 32 is attempting to reverse zoom—i.e. zoom out—the picture image 16', 16 within the picture region/image window 17, then, in step (1610), if the picture image 16', 16 does not fill the picture region/image window 17, then, in step (1606), the picture region/image window 17 is selected for subsequent manipulation by the display process 1100, so as to provide for the picture image 16', 16 exclusively to be zoomed out. Otherwise, from step (1610), if the picture image 16', 16 fills the associated picture region/image window 17, or, in one set of embodiments, otherwise from step (1608), then, in step (1612), the composite image 14 is selected for subsequent manipulation by the display process 1100, so as to provide for zooming out of the composite image 14 even though it is the picture image 16', 16 that has been selected. Otherwise, from step (1602), if the interaction of the user 32 with the image display 12 is outside the picture region/image window 17, then, in step (1614), if not already rescaled, the picture image 16', 16 is rescaled to fit the picture region/image window 17 of the composite image 14 and, in step (1612), the composite image 14 is selected for subsequent manipulation by the display process 1100.

Figure 17A:
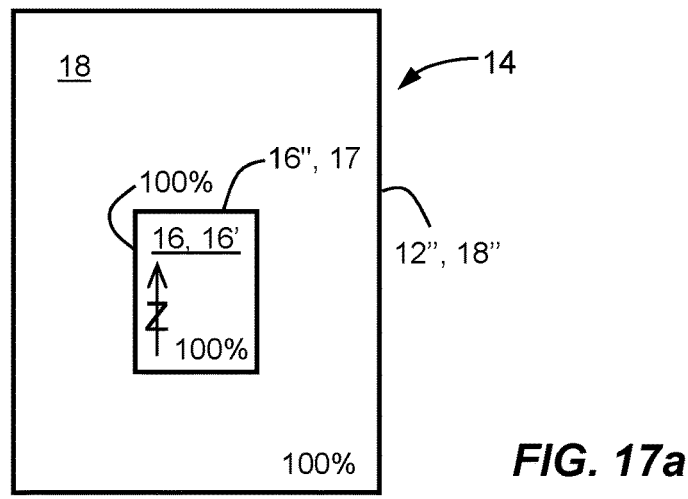
FIG. 17a illustrates a schematic illustration of an original composite image prior to manipulation by a display process in cooperation with a set of examples of the third-embodiment intention-determination process.
Figure 17B:
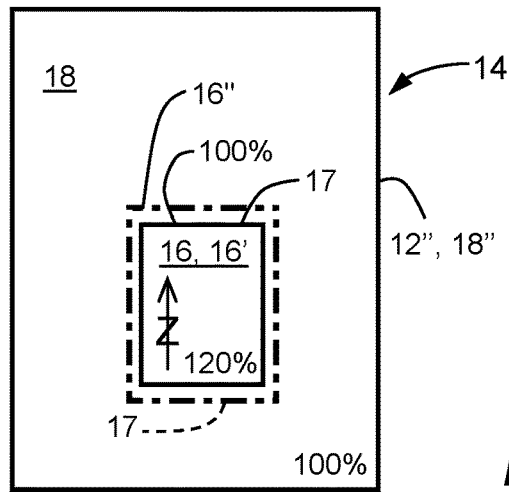
FIG. 17b illustrates a schematic illustration of a zoomed version of the composite image illustrated in FIG. 17a, zoomed from within the picture image portion thereof.
Figure 17C:
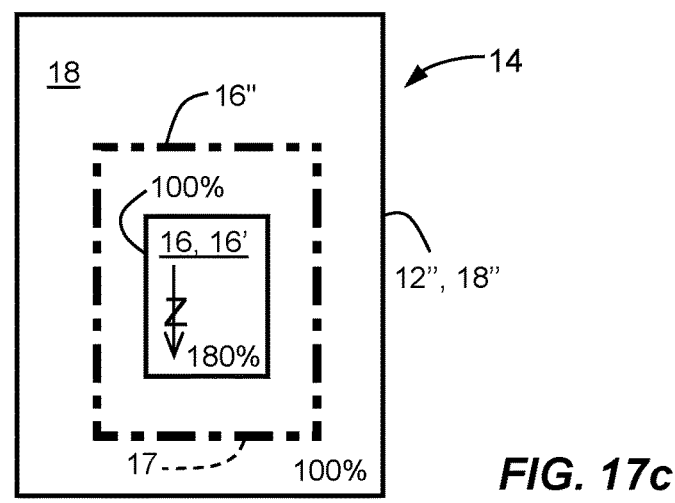
FIG. 17c illustrates a schematic illustration of a zoomed version of the composite image illustrated in FIG. 17b, zoomed from within the picture image portion thereof.

FIGS. 17a though 17i illustrate various aspects of the operation of the third-embodiment intention-determination process 1600. For example, beginning with FIG. 17a, —which illustrates a composite image 14 on an image display 12 following step (306) of the fourth-aspect display process 1100, responsive to a zoom command actuated by the user 32 within the picture image 16', 16 portion of the composite image 14, from step (1606) following step (1604), the picture image 16', 16 is selected and zoomed in step (704) of the fourth-aspect display process 1100, which, in one set of embodiments, inherently causes the picture image 16', 16 to be cropped by the picture region/image window 17 of the composite image 14, so that the virtual edge 16" of the picture image 16', 16 extends beyond the picture region/image window 17 of the composite image 14 when redrawing the picture image 16', 16 in step (706) of the fourth-aspect display process 1100, resulting in the zoomed picture image 16', 16 as illustrated in FIG. 17b. For example, FIG. 17b illustrates an expansion by 120% of the picture image 16', 16 relative to the original size thereof. Alternatively, in another set of embodiments, the picture region/image window 17 could be configured to conform to the expanded picture image 16', 16, so that what had been the virtual edge 16" of the picture image 16', 16 corresponds to an expanded edge of the picture region/image window 17. As another example, FIG. 17c illustrates an expansion by 180% of the picture image 16', 16 relative to the original size thereof, as a result of a zooming of the picture image 16', 16 illustrated in FIG. 17a, or a further zooming of the picture image 16', 16 illustrated in FIG. 17b, so that the virtual edge 16" of the picture image 16', 16 extends/further extends beyond the picture region/image window 17 of the composite image 14 when redrawing the picture image 16', 16 in step (706) of the fourth-aspect display process 1100, resulting in the zoomed picture image 16', 16 as illustrated in FIG. 17c. Alternatively, in another set of embodiments, the picture region/image window 17 could be configured to conform to the expanded picture image 16', 16, so that what had been the virtual edge 16" of the picture image 16', 16 corresponds to an expanded edge of the picture region/image window 17, rather than being cropped by the originally-sized picture region/image window 17 of the composite image 14 as illustrated in FIG. 17c.

Figure 17D:
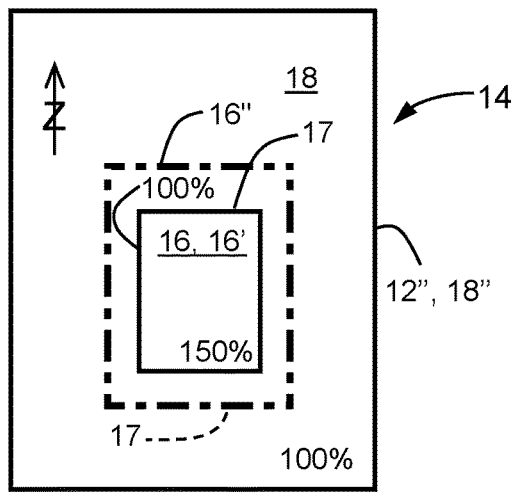
FIG. 17d illustrates a schematic illustration of a reverse-zoomed version of the composite image illustrated in FIG. 17c, reverse-zoomed from within the picture image portion thereof.

Beginning with the composite image 14 illustrated in FIG. 17c, a reverse zoom of the picture image 16', 16 from within the picture region/image window 17, per successive steps (1608), (1610) and (1606), initially results in exclusively zooming out the picture image 16', 16 until the picture image 16', 16 fills the associated picture region/image window 17 of the composite image 14. For example, FIG. 17d illustrates a reduction in the expansion of the picture image 16', 16 from 180% to 150% relative to the original size thereof, without affecting the overall size of the composite image 14, nor that of the associated picture region/image window 17. Alternatively, in another set of embodiments, the picture region/image window 17 could be configured to conform to the reduced size of the picture image 16', 16, so that what had been the virtual edge 16" of the picture image 16', 16 corresponds to a lesser-expanded edge of the picture region/image window 17 relative to that illustrated in FIG. 17c.

Figure 17E:
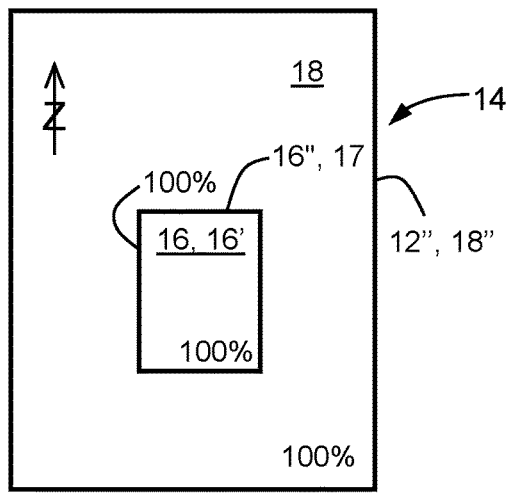
FIG. 17e illustrates a schematic illustration of a zoomed version of the composite image illustrated in FIG. 17d, zoomed from within the background image portion thereof, just prior to further zooming of the associated background portion.

Beginning with the composite image 14 illustrated in FIG. 17d, a zoom from within the background image 18 thereof—i.e. outside of the picture region/image window 17—per step (1614), initially results in the picture image 16', 16 being rescaled to the picture region/image window 17 of the composite image 14, for example, as illustrated in FIG. 17e, which illustrates the same composite image 14 as had been illustrated in FIG. 17a. Thereafter, a continued zoom from within the background image 18—i.e. outside of the picture region/image window 17 —per steps (1602) and (1612) via step (1614), results in an expansion of the composite image 14, including the associated picture region/image window 17, after which, in step (312), the picture image 16', 16 is expanded to fill the expanded picture region/image window 17, so as to result in the composite image 14 illustrated in FIG. 17f. For example, FIG. 17f illustrates an expansion by 130% of the composite image 14 relative to the original size thereof.

Figure 17F:
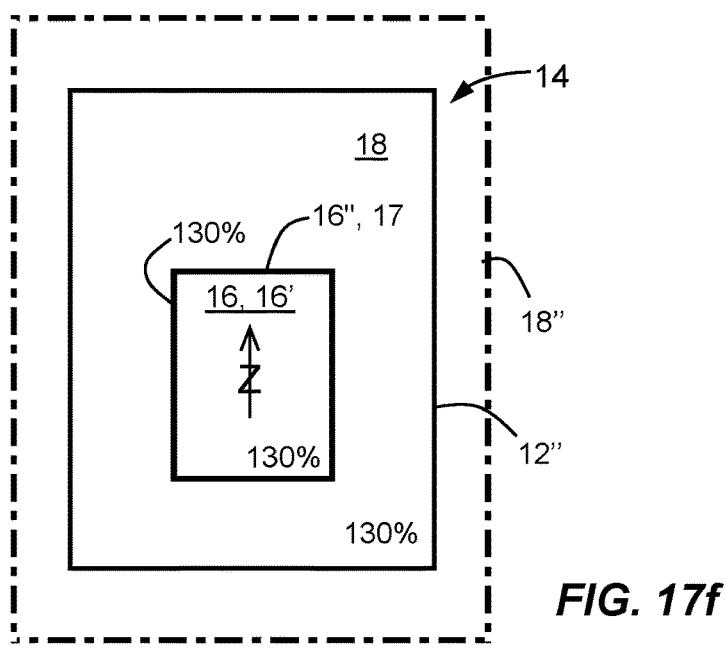
FIG. 17f illustrates a schematic illustration of a zoomed version of the composite image illustrated in FIG. 17e, zoomed from within the background image portion thereof.
Figure 17G:
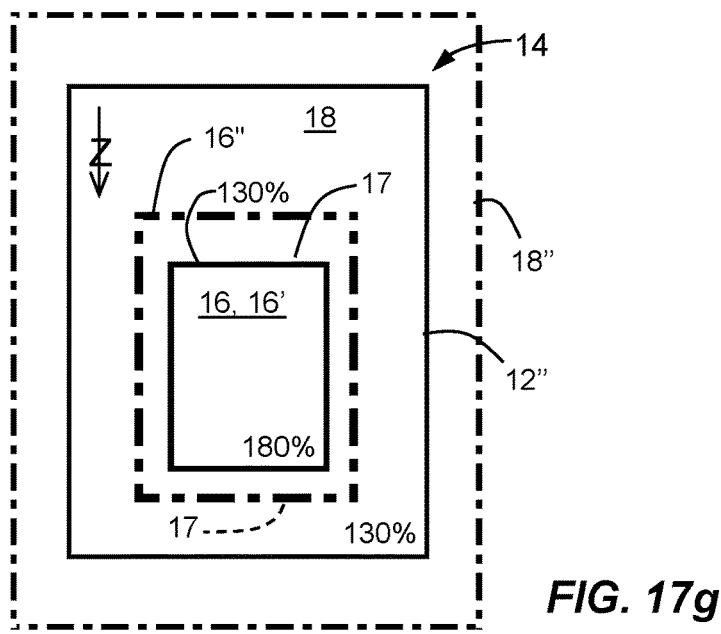
FIG. 17g illustrates a schematic illustration of a zoomed version of the composite image illustrated in FIG. 17e, zoomed from within the picture image portion thereof.

Beginning with the composite image 14 illustrated in FIG. 17f, a zoom from within the picture image 16', 16— i.e. inside the picture region/image window 17,— results in an expansion of the picture image 16', 16, for example, as illustrated in FIG. 17g, by 180% relative to the original size thereof, without affecting either the expanded background image 18 nor size of the associated picture region/image window 17. Alternatively, in another set of embodiments, the picture region/image window 17 could be configured to conform to the increased size of the picture image 16', 16, so that what had been the virtual edge 16" of the picture image 16', 16 corresponds to an expanded edge of the picture region/image window 17 relative to that illustrated in FIG. 17g.

Figure 17H:
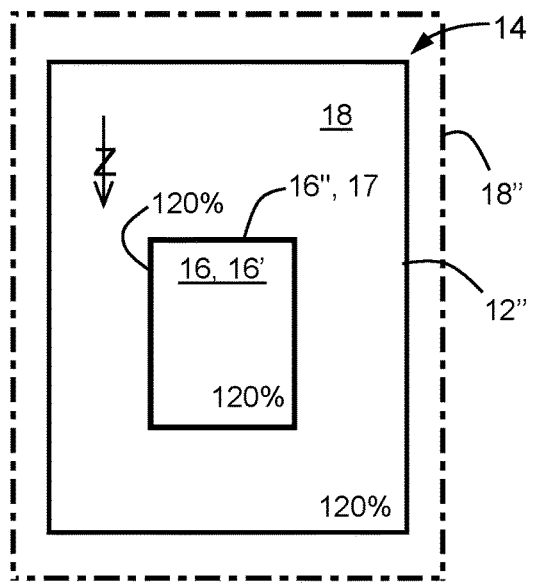
FIG. 17h illustrates a schematic illustration of a reverse-zoomed version of the composite image illustrated in FIG. 17g, reverse-zoomed from within the background image portion thereof.

Beginning with the composite image 14 illustrated in FIG. 17g, a reverse zoom from within the background image 18—i.e. outside of the picture region/image window 17—per step (1614), initially results in the picture image 16', 16 being rescaled to the picture region/image window 17 of the composite image 14, for example, as illustrated in FIG. 17h, which also illustrates the associated background image 18 and size of the picture region/image window 17 of the composite image 14 each being reduced in size, for example, to 120% of their original sizes.

Figure 17I:
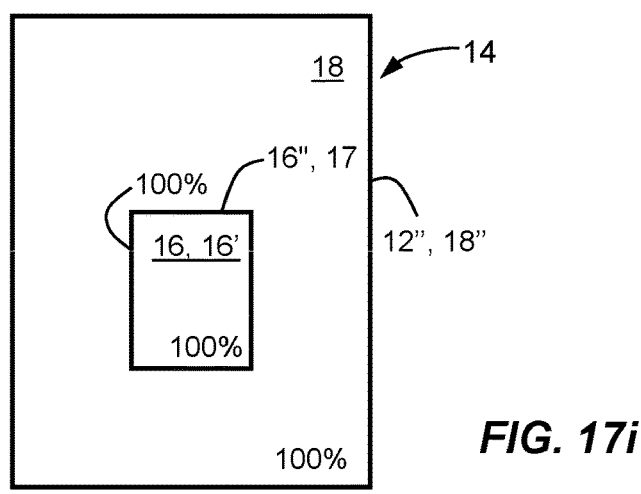

Beginning with the composite image 14 illustrated in FIG. 17h, a sufficient reverse zoom from within the background image 18 thereof then provides for reverting to the original composite image 14 as illustrated in FIG. 17i, as had been also illustrated in FIGS. 17a and 17e.

In accordance with one set of aspects, a method of displaying a composite image 14 on an image display 12 includes a) receiving or generating a first portion of image content 18 of the composite image 14; b) receiving at least one second portion of image content 16 of the composite image 14, wherein each at least one second portion of image content 16 is displayed within a corresponding at least one picture region/image window 17 within the composite image 14; c) displaying the composite image 14 on the image display 12; d) providing for modifying at least one image property of at least the first portion of image content 18 of the composite image 14 as displayed on an image display 12, wherein the at least one image property is selected from the group consisting of a resolution, a level of magnification, a measure of pan, a size, and a scale; and e) providing for modifying at least one image property of at least one at least one second portion of image content 16, wherein the at least one image property is selected from the group consisting of a resolution, a level of magnification, a measure of pan, a size, and a scale; the operation of modifying the at least one image property of the at least one at least one second portion of image content 16 comprises receiving either supplemental or replacement image data that provides for forming a modified version of the at least one at least one second portion of image content 16 having a corresponding modified at least one image property that may be independent of a corresponding value of the at least one image property of the first portion of image content 18; and the operation of modifying the at least one image property of the at least one second portion of image content 16 is responsive to an action by the user that indicates at least an interest in, or focus on, the at least one second portion of image content 16.

In accordance with another aspect, the at least one second portion of image content 16 is initially displayed within the corresponding at least one picture region/image window 17 at a first resolution, and the at least one second portion of image content 16 is subsequently displayed within the corresponding at least one picture region/image window 17 at a second resolution greater than the first resolution responsive to receiving the either supplemental or replacement image data associated with the at least one second portion of image content 16, and the either supplemental or replacement image data in combination with previous image data of the at least one second portion of image content 16 provides for generating the at least one second portion of image content 16 at the second resolution. In accordance with one set of embodiments the either supplemental or replacement image data provides for the entirety of the second portion of image content to be displayed at the second resolution. In accordance with another set of embodiments the either supplemental or replacement image data provides for the entirety of the second portion of image content within the corresponding at least one picture region/image window 17 to be displayed at the second resolution.

In accordance with yet another aspect, the at least one second portion of image content 16 is initially displayed within the corresponding at least one picture region/image window 17 at a first level of magnification, and the at least one second portion of image content 16 is subsequently displayed within the corresponding at least one picture region/image window 17 at a second level of magnification greater than the first level of magnification responsive to receiving either supplemental or replacement image data associated with the at least one second portion of image content 16, and the either supplemental or replacement image data in combination with previous image data of the at least one second portion of image content 16 provides for generating the at least one second portion of image content 16 at the second level of magnification. In one set of embodiments, the either supplemental or replacement image data provides for at least the magnified portion of the second portion of the image content to be displayed at the second level of magnification within the at least one picture region/image window 17. Furthermore, the either supplemental or replacement image data may provide for the entirety of the corresponding at least one picture region/image window 17 from which the portion to be magnified is selected. Yet further, the magnified portion of the second portion of the image content to be displayed at the second level of magnification within the at least one picture region/image window 17 may be selected by a user, for example, responsive to either a screen-touch gesture, a selection with a mouse, and a selection with a pointing device.

In accordance with yet another aspect, at least one set of data selected from the group consisting of the second portion of image content and the either supplemental or replacement image data incorporates metadata indicative of which of the at least one image property is susceptible to further modification responsive to subsequent receipt of the either supplemental or replacement image data. In one set of embodiments, the metadata comprises a naming convention of at least one file selected from at least one file associated with the second portion of image content.

In accordance with yet another aspect, a size of the picture region/image window 17 in relation to that of the composite image 14 can be modified.

It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof

What is claimed is:

1. A method of displaying a composite image on an image display, comprising:
    a. receiving or generating a first portion of image content of the composite image;
    b. receiving at least one second portion of image content of said composite image, wherein each said at least one second portion of image content is displayed within a corresponding at least one picture region within said composite image;
    c. displaying said composite image on the image display;
    d. providing for modifying at least one image property of at least said first portion of image content of said composite image as displayed on said image display, wherein said at least one image property is selected from the group consisting of a resolution, a level of magnification, a measure of pan, a size, and a scale; and
    e. providing for modifying at least one image property of at least one said at least one second portion of image content, wherein said at least one image property is selected from group consisting of resolution, a level of magnification, a measure of pan, a size, and a scale; the operation of modifying said at least one image property of said at least one said at least one second portion of image content comprises receiving either supplemental or replacement image data that provides for forming a modified version of said at least one said at least one second portion of image content having a corresponding modified said at least one image property that may be independent of a corresponding value of said at least one image property of said first portion of image content; the operation of modifying said at least one image property of said at least one said at least one second portion of image content is responsive to an action by a user that indicates at least an interest in or focus on said at least one second portion of image content, and the entire portion of said composite image that is displayed within said at least one picture region is independently controllable relative to the remaining portion of said composite image.

2. A method of displaying a composite image on an image display as recited in claim 1, wherein said at least one second portion of image content is initially displayed within said corresponding at least one picture region at a first resolution, and said at least one second portion of image content is subsequently displayed within said corresponding at least one picture region at a second resolution greater than said first resolution responsive to receiving said either supplemental or replacement image data associated with said at least one second portion of image content, and said either supplemental or replacement image data in combination with previous image data of said at least one second portion of image content provides for generating said at least one second portion of image content at to said second resolution.

3. A method of displaying a composite image on an image display as recited in claim 2, wherein said either supplemental or replacement image data provides for an entirety of said at least one said at least one second portion of image content to be displayed at said second resolution.

4. A method of displaying a composite image on an image display as recited in claim 2, wherein said either supplemental or replacement image data provides for an entirety of said at least one said at least one second portion of image content within said corresponding at least one picture region to be displayed at said second resolution.

5. A method of displaying a composite image on an image display as recited in claim 1, wherein said at least one said at least one second portion of image content is initially displayed within said corresponding at least one picture region at a first level of magnification, and said at least one said at least one second portion of image content is subsequently displayed within said corresponding at least one picture region at a second level of magnification greater than said first level of magnification responsive to receiving said either supplemental or replacement image data associated with said at least one said at least one second portion of image content, and said either supplemental or replacement image data in combination with previous image data of said at least one said at least one second portion to of image content provides for generating said at least one said at least one second portion of image content at said second level of magnification.

6. A method of displaying a composite image on an image display as recited in claim 5, wherein said either supplemental or replacement image data provides for at least a magnified portion of said at least one said at least one second portion of image content to be displayed at said second level of magnification within said corresponding at least one picture region.

7. A method of displaying a composite image on an image display as recited in claim 6, wherein said either supplemental or replacement image data provides for magnification of an entirety of said corresponding at least one picture region from which said magnified portion is selected.

8. A method of displaying a composite image on an image display as recited in claim 6, wherein said magnified portion of said at least one said at least one second portion of image content to be displayed at said second level of magnification within said corresponding at least one picture region is selected by a user.

9. A method of displaying a composite image on an image display as recited in claim 8, wherein said corresponding at least one picture region is selected by a user responsive to a user action selected from the group consisting of a screen-touch gesture, a selection with a mouse and a selection with a pointing device.

10. A method of displaying a composite image on an image display as recited in claim 1, wherein at least one set of data selected from the group consisting of said at least one said at least one second portion of image content and said either supplemental or replacement image data incorporates metadata indicative of which of said at least one image property is susceptible to further modification responsive to subsequent receipt of said either supplemental or replacement image data.

11. A method of displaying a composite image on an image display as recited in claim 10, wherein said metadata comprises a naming convention of at least one file selected from at least one file associated with said at least one said at least one second portion of image content and at least one file associated with said either supplemental or replacement image data.

12. A method of displaying a composite image on an image display as recited in claim 1, wherein a size of said corresponding at least one picture region can be modified in relation to that of said composite image.

* * * * *

UNITED STATES PATENT AND TRADEMARK OFFICE
CERTIFICATE OF CORRECTION

| | | |
|---|---|---|
| PATENT NO. | : 11,620,775 B2 | |
| APPLICATION NO. | : 17/216557 | |
| DATED | : April 4, 2023 | |
| INVENTOR(S) | : Shawn L. Kelly | |

It is certified that error appears in the above-identified patent and that said Letters Patent is hereby corrected as shown below:

On the Title Page
On Page 2, Item (56) References Cited, US PATENT DOCUMENTS:
For U.S. PATENT DOCUMENT 2009/0002397, "Forlines" should be replaced with --Forlines et al.--; and
For U.S. PATENT DOCUMENT 2015/0346969, "Strabbing" should be replaced with --Strabbing et al.--.

In the Specification
Column 1 at Line 49, Column 6 at indicated Line 62, Column 7 at Line 4, Column 8 at Line 26, and Column 9 at Line 23, "A-" should be replaced with --A--.
Column 2 at Line 14, Column 9 at Line 39, Column 10 at indicated Line 60, and Column 11 at Line 8, "B'-" should be replaced with --B'--.
Column 2 at indicated Line 23, and Column 11 at Line 10, "C-" should be replace with --C--.
Column 2 at indicated Line 28, and Column 11 at Line 23, "C'-" should be replaced with --C'--.
Column 3 at indicated Line 25, "FIG." should be replaced with --FIGS.--.
Column 8 at Line 41, "includes" should be replaced with --include--.
Column 9 at Line 24, "B-" should be replaced with --B--.
Column 13 at Line 41, "transitions" should be replaced with --transition--.
Column 18 at Line 56, "Clean Version" should be deleted, and the text that immediately follows should be merged with the preceding paragraph.

In the Claims
Column 25 at indicated Line 25, the last line of Claim 2, and Column 26 at Line 6, the fourth to last line of Claim 5, "to" should be deleted.

Signed and Sealed this
Twenty-third Day of May, 2023

Katherine Kelly Vidal
*Director of the United States Patent and Trademark Office*